United States Patent
Kaufman

(10) Patent No.: US 9,842,372 B2
(45) Date of Patent: Dec. 12, 2017

(54) SYSTEMS AND METHODS FOR CONTROLLING ASSETS USING ENERGY INFORMATION DETERMINED WITH AN ORGANIZATIONAL MODEL OF AN INDUSTRIAL AUTOMATION SYSTEM

(71) Applicant: ROCKWELL AUTOMATION TECHNOLOGIES, INC., Mayfield Heights, OH (US)

(72) Inventor: Philip J. Kaufman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1307 days.

(21) Appl. No.: 13/843,419

(22) Filed: Mar. 15, 2013

(65) Prior Publication Data
US 2014/0277794 A1    Sep. 18, 2014

(51) Int. Cl.
G06Q 50/06    (2012.01)
G06Q 10/06    (2012.01)
G05B 13/02    (2006.01)

(52) U.S. Cl.
CPC ............. *G06Q 50/06* (2013.01); *G06Q 10/06* (2013.01); *G05B 13/02* (2013.01)

(58) Field of Classification Search
CPC .. G06Q 10/06; G06Q 50/06; G06Q 10/06315; G05B 15/02; G05B 17/02; G05B 13/02; H02J 2003/007
USPC ........................... 700/95–212, 291, 286, 295
See application file for complete search history.

(56) References Cited

U.S. PATENT DOCUMENTS

| | | | |
|---|---|---|---|
| 4,300,125 | A | 11/1981 | Loshing et al. |
| 4,341,345 | A | 7/1982 | Hammer et al. |
| 4,383,298 | A | 5/1983 | Huff et al. |
| 4,827,395 | A | 5/1989 | Anders et al. |
| 5,202,996 | A | 4/1993 | Sugino et al. |
| 5,822,207 | A | 10/1998 | Hazama et al. |

(Continued)

FOREIGN PATENT DOCUMENTS

| | | |
|---|---|---|
| EP | 0977137 A2 | 2/2000 |
| WO | WO 2004/074954 A2 | 2/2004 |
| WO | WO 2008/011427 A2 | 1/2008 |

OTHER PUBLICATIONS

M. Kazandjieva, O. Gnawali, B. Heller, P. Levis, and C. Kozyrakis. Identifying energy waste through dense power sensing and utilization monitoring. Technical report, Stanford University, Tech. Rep. CSTR Mar. 2010, 2010.*

(Continued)

*Primary Examiner* — Sean Shechtman
*Assistant Examiner* — Shon Foley
(74) *Attorney, Agent, or Firm* — Fletcher Yoder, P.C.

(57) ABSTRACT

A system may include a processor that may receive structured energy data associated with one or more assets in an automation system such that the structured energy data comprises a logical grouping of assets in the automation system. The processor may also determine energy properties of the one or more assets with respect to the logical grouping over a period of time, identify one or more idle periods of the one or more assets with respect to the logical grouping during the period of time based on the energy properties, and send one or more commands to the one or more assets to enter a reduced power consumption mode during the idle periods.

7 Claims, 9 Drawing Sheets

(56) References Cited

U.S. PATENT DOCUMENTS

| | | | |
|---|---|---|---|
| 5,924,486 A | 7/1999 | Ehlers et al. | |
| 6,012,053 A | 1/2000 | Pant et al. | |
| 6,015,783 A | 1/2000 | von der Osten et al. | |
| 6,263,255 B1 | 7/2001 | Tan et al. | |
| 6,281,784 B1 | 8/2001 | Redgate et al. | |
| 6,289,252 B1 | 9/2001 | Wilson et al. | |
| 6,321,983 B1 | 11/2001 | Katayanagi et al. | |
| 6,633,823 B2 | 10/2003 | Bartone et al. | |
| 6,701,298 B1 | 3/2004 | Jutsen | |
| 6,732,055 B2 | 5/2004 | Bagepalli et al. | |
| 6,747,368 B2 | 6/2004 | Jarrett, Jr. | |
| 6,785,592 B1 | 8/2004 | Smith et al. | |
| 6,857,020 B1 | 2/2005 | Chaar et al. | |
| 6,859,755 B2 | 2/2005 | Eryurek et al. | |
| 7,043,316 B2 | 5/2006 | Farchmin et al. | |
| 7,274,975 B2* | 9/2007 | Miller | G06Q 50/06 700/295 |
| 7,277,864 B2 | 10/2007 | Ohnemus et al. | |
| 7,409,303 B2 | 8/2008 | Yeo et al. | |
| 7,451,019 B2 | 11/2008 | Rodgers | |
| 7,477,956 B2 | 1/2009 | Huang et al. | |
| 7,531,254 B2 | 5/2009 | Hibbs et al. | |
| 7,565,227 B2* | 7/2009 | Richard | G06Q 10/06312 700/286 |
| 7,565,351 B1 | 7/2009 | Callaghan | |
| 7,587,251 B2 | 9/2009 | Hopsecger | |
| 7,747,416 B2 | 6/2010 | Deininger et al. | |
| 7,788,189 B2 | 8/2010 | Budike, Jr. | |
| 8,068,938 B2 | 11/2011 | Fujita | |
| 8,271,363 B2 | 9/2012 | Branscomb | |
| 2002/0013744 A1 | 1/2002 | Tsunenari et al. | |
| 2002/0026343 A1 | 2/2002 | Duenke | |
| 2002/0066072 A1 | 5/2002 | Crevatin | |
| 2002/0099464 A1 | 7/2002 | O'Connor et al. | |
| 2002/0099804 A1 | 7/2002 | O'Connor et al. | |
| 2002/0116239 A1 | 8/2002 | Reinsma et al. | |
| 2002/0169582 A1 | 11/2002 | Eryurek et al. | |
| 2002/0178047 A1 | 11/2002 | Or et al. | |
| 2002/0198755 A1 | 12/2002 | Birkner et al. | |
| 2003/0014500 A1 | 1/2003 | Schleiss et al. | |
| 2003/0028527 A1 | 2/2003 | Crosby et al. | |
| 2003/0061091 A1 | 3/2003 | Amaratunga et al. | |
| 2003/0088370 A1 | 5/2003 | Bagepalli et al. | |
| 2003/0110065 A1 | 6/2003 | Twigge-Molecey | |
| 2003/0110369 A1 | 6/2003 | Fish et al. | |
| 2003/0171851 A1 | 9/2003 | Brickfield et al. | |
| 2004/0088119 A1 | 5/2004 | Landgraf | |
| 2004/0107345 A1 | 6/2004 | Brandt et al. | |
| 2004/0117240 A1 | 6/2004 | Ness et al. | |
| 2004/0158506 A1 | 8/2004 | Wille | |
| 2004/0199294 A1 | 10/2004 | Fairlie et al. | |
| 2004/0205412 A1 | 10/2004 | Staron et al. | |
| 2004/0249697 A1 | 12/2004 | Ohnemus et al. | |
| 2004/0260489 A1 | 12/2004 | Mansingh et al. | |
| 2005/0015287 A1 | 1/2005 | Beaver | |
| 2005/0034023 A1 | 2/2005 | Maturana et al. | |
| 2005/0065971 A1 | 3/2005 | Honda | |
| 2005/0143865 A1 | 6/2005 | Gardner | |
| 2005/0144154 A1 | 6/2005 | DeMesa et al. | |
| 2005/0171910 A1 | 8/2005 | Wu et al. | |
| 2005/0198241 A1 | 9/2005 | Pavlik et al. | |
| 2005/0198333 A1 | 9/2005 | Dinges et al. | |
| 2005/0278296 A1 | 12/2005 | Bostwick | |
| 2006/0026145 A1 | 2/2006 | Beringer et al. | |
| 2006/0248002 A1 | 11/2006 | Summer et al. | |
| 2007/0038646 A1 | 2/2007 | Thota | |
| 2007/0073750 A1 | 3/2007 | Chand et al. | |
| 2007/0283030 A1 | 12/2007 | Deininger et al. | |
| 2008/0015975 A1 | 1/2008 | Ivchenko et al. | |
| 2008/0046387 A1 | 2/2008 | Gopal et al. | |
| 2008/0046407 A1 | 2/2008 | Shah et al. | |
| 2008/0059457 A1 | 3/2008 | Ohnemus et al. | |
| 2008/0079560 A1 | 4/2008 | Hall et al. | |
| 2008/0127779 A1 | 6/2008 | Morales Cerda et al. | |
| 2008/0154749 A1 | 6/2008 | D'hooghe et al. | |
| 2008/0255899 A1 | 10/2008 | McConnell et al. | |
| 2008/0270272 A1 | 10/2008 | Branscomb | |
| 2008/0272934 A1 | 11/2008 | Wang et al. | |
| 2008/0319812 A1 | 12/2008 | Sousa et al. | |
| 2009/0083843 A1 | 3/2009 | Wilkinson, Jr. et al. | |
| 2009/0099887 A1 | 4/2009 | Sklar et al. | |
| 2009/0100159 A1 | 4/2009 | Extra | |
| 2009/0132176 A1 | 5/2009 | McConnell et al. | |
| 2009/0138415 A1 | 5/2009 | Lancaster | |
| 2009/0177505 A1 | 7/2009 | Dietrich et al. | |
| 2009/0222307 A1 | 9/2009 | Beaver | |
| 2009/0281674 A1 | 11/2009 | Taft | |
| 2009/0281677 A1 | 11/2009 | Botich et al. | |
| 2009/0313164 A1 | 12/2009 | Hoglund | |
| 2009/0319315 A1 | 12/2009 | Branscomb | |
| 2010/0023360 A1 | 1/2010 | Nadhan | |
| 2010/0030601 A1 | 2/2010 | Warther et al. | |
| 2010/0042455 A1 | 2/2010 | Liu et al. | |
| 2010/0057480 A1 | 3/2010 | Arfin et al. | |
| 2010/0088136 A1 | 4/2010 | Cheng et al. | |
| 2010/0100405 A1 | 4/2010 | Lepore et al. | |
| 2010/0131343 A1 | 5/2010 | Hamilton | |
| 2010/0138003 A1 | 6/2010 | August et al. | |
| 2010/0168897 A1* | 7/2010 | August | G05B 19/042 700/105 |
| 2010/0217642 A1 | 8/2010 | Crabtree et al. | |
| 2010/0217651 A1 | 8/2010 | Crabtree et al. | |
| 2010/0218108 A1 | 8/2010 | Crabtree et al. | |
| 2010/0249975 A1 | 9/2010 | Rezayat | |
| 2010/0262445 A1 | 10/2010 | DeSorbo | |
| 2010/0274367 A1 | 10/2010 | Kaufman et al. | |
| 2010/0274377 A1* | 10/2010 | Kaufman | G06Q 10/06 700/103 |
| 2010/0274602 A1 | 10/2010 | Kaufman et al. | |
| 2010/0274603 A1 | 10/2010 | Walker et al. | |
| 2010/0274611 A1 | 10/2010 | Kaufman et al. | |
| 2010/0274612 A1 | 10/2010 | Walker et al. | |
| 2010/0274629 A1 | 10/2010 | Walker et al. | |
| 2010/0274810 A1 | 10/2010 | Walker et al. | |
| 2010/0275147 A1 | 10/2010 | Kaufman et al. | |
| 2010/0292856 A1 | 11/2010 | Fujita | |
| 2010/0314940 A1 | 12/2010 | Palmer et al. | |
| 2010/0318233 A1 | 12/2010 | Yunes et al. | |
| 2010/0332373 A1 | 12/2010 | Crabtree et al. | |
| 2011/0046792 A1* | 2/2011 | Imes | H04L 67/42 700/278 |
| 2011/0046800 A1 | 2/2011 | Imes et al. | |
| 2011/0071721 A1 | 3/2011 | Gilfillan et al. | |
| 2011/0166710 A1* | 7/2011 | Kordik | H02J 3/14 700/277 |
| 2011/0172838 A1 | 7/2011 | Pai et al. | |
| 2011/0273022 A1 | 11/2011 | Dennis et al. | |
| 2012/0221163 A1* | 8/2012 | Forbes, Jr. | G06Q 10/00 700/295 |

OTHER PUBLICATIONS

Abb, "Energy Management and Optimization for the Process Industries—Advanced IT Tools for Planning, Monitoring, Controlling, and Reporting Energy System Operations", Aug. 11, 2006 Brochure, published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009, 6 pages.

Abb, "Energy Management Solution for the Process Industry—Energy Management and Optimization", Apr. 6, 2007 Brochure, published online at [http://library.abb.com/global/scot/scot313.nsf/veritydisplay/5e48efb88a7e1cbac125734600737b02/$File/3BFI405000R4001_en_Energy_Management_and_Optimization_3.5.pdf], retrieved Apr. 13, 2009, 12 pages.

A.D. Jayal, F. Badurdeen, O.W. Dillon Jr., I.S. Jawahir, "Sustainable manufacturing: Modeling and optimization challenges at the product, process, and system levels," CIRP Journal of Manufacturing Science and Technology, vol. 2, Issue 3, 2010, pp. 144-152, ISSN 1755-5817.

(56) References Cited

OTHER PUBLICATIONS

Dietmair, A., et al., "Energy Consumption and Optimization for Production Machines", Sustain-able Energy Technologies, 2008, ICSET 2008, IEEE International Conference on IEEE, Piscataway, NJ, USA, Nov. 24, 2008, pp. 574-579, XP031442235, ISBN:978-1-4244-1887-9.

Dillenburg, Stephen, Timothy Greene, and O. Homer Erekson. "Approaching socially responsible investment with a comprehensive ratings scheme: Total social impact." Journal of Business Ethics 43.3 (2003): 167-177.

EPO: Notice from the European Patent Office dated Oct. 1, 2007 concerning Business Methods, Official Journal of the European Patent Office, vol. 30, No. 11, Nov. 1, 2007, pp. 592-593.

European Search Report for European Patent Application No. 10160581.4-1238 dated Sep. 23, 2010, 8 pages.

European Search Report for European Patent Application No. 10160585.5-1527/2254061 dated Dec. 20, 2010, 9 pages.

European Search Report for European Patent Application No. 10160649.9-1238 dated Sep. 23, 2010, 8 pages.

European Search Report for European Patent Application No. 10160673.9-1238 dated Sep. 23, 2010, 9 pages.

European Search Report for European Patent Application No. 10160737.2-1238 dated Nov. 4, 2010, 9 pages.

European Search Report for European Patent Application No. 10160810 dated Aug. 6, 2010, 2 pages.

European Search Report for European Patent Application No. 10160811.5 dated Sep. 20, 2010, 9 pages.

GE Energy, "Energy and Asset Performance—Fact Sheet", Sep. 2005, General Electric Company, published online at [http://www.gepower.com/prod_serv/serv/industrial_service/en/downloads/gea14163_eap.pdf], retrieved Apr. 13, 2009, 2 pages.

Jawahir, I. S., et al. "Total life-cycle considerations in product design for sustainability: A framework for comprehensive evaluation." Proc. $10^{th}$ Int. Research/Expert Conf. (TMT 2006), Barcelona, Spain, 2006.

Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.

Kiritsis D., et al., "Research Issues on Product Lifecycle Management and Information Tracking Using Smart Embedded Systems", Advanced Engineering Informatics, Elsevier Lnkd—DOI : 10.1016/J. AEI.2004.09.005, vol. 17, No. 3-4, Jul. 1, 2003, pp. 189-202, XP004595481 ISSN: 1474-0346.

Kouloura, et al., "A Systems Approach to Corporate Sustainability in Energy Management of Industrial Units", IEEE Systems Journal, vol. 2, No. 4, Dec. 2008, pp. 442-452.

Seref Erkayhan Ed—Ding Zhen-Hua, et al., "The Use of RFID Enables a Holistic Information Management Within Product Lifcycle Management (PLM)". RFID EURASIA, 2007 $1^{st}$ Annual, IEEE, PI Sep. 1, 2007, pp. 1-4 XP031153342. ISBN: 978-975-01-5660-1.

Yang, et al., "Eco-Design for Product Lifecycle Sustainability", IEEE International Conference on Industrial Informatics, 2006, pp. 548-553.

Y-S Ma, et al., "Product Lifecycle Analysis and Optimization in an Eco-Value Based, Sustainable and Unified Approach", Industrial Informatics, 2006 IEEE International Conference on, IEEE, PI, Aug. 1, 2006, pp. 537-541, XP031003409, ISBN:978-0-7803-9700-2.

U.S. Appl. No. 13/275,983, filed Oct. 18, 2011, David D. Brandt.

\* cited by examiner

SYSTEMS AND METHODS FOR CONTROLLING ASSETS USING ENERGY INFORMATION DETERMINED WITH AN ORGANIZATIONAL MODEL OF AN INDUSTRIAL AUTOMATION SYSTEM

CROSS REFERENCE TO RELATED APPLICATIONS

This application is related to U.S. patent application Ser. No. 12/684,469, entitled "Industrial Control Energy Object," filed Jan. 8, 2010, which is herein incorporated by reference. This application is also related to U.S. patent application Ser. No. 13/275,983, entitled "Industrial Control Energy Object," filed Oct. 18, 2011, which is herein incorporated by reference.

BACKGROUND

The present disclosure relates generally to collecting and organizing energy information from assets being employed in an industrial automation system. More particularly, embodiments of the present disclosure relate to using an organizational model in conjunction with energy information acquired from assets in the industrial automation system to determine energy data (i.e., consumption or production) for individual assets and for individual and scalable parts of the industrial automation system.

Industrial automation systems generally include a variety of energy consuming assets employed in a production process (e.g., different assembly lines for a single product) or the like. Some of the assets in the industrial automation system may be capable of communicating its corresponding energy data with other controllers within the industrial automation system or to a supervisory control system that may be stationed outside the industrial automation system. In any case, although the energy information acquired via the communicating assets may be beneficial in understanding how energy is being utilized within the industrial automation system, the acquired energy information is often individualized such that it primarily provides information related to a specific device without regard to how the energy information is related to scalable parts of the industrial automation system or the industrial automation system as a whole. Accordingly, improved systems and methods for analyzing the energy information related to scalable parts of the industrial automation system are desirable.

BRIEF DESCRIPTION

In one embodiment, a system may include a processor that may receive structured energy data associated with one or more assets in an automation system such that the structured energy data comprises a logical grouping of assets in the automation system. The processor may also determine energy properties of the one or more assets with respect to the logical grouping over a period of time, identify one or more idle periods of the one or more assets with respect to the logical grouping during the period of time based on the energy properties, and send one or more commands to the one or more assets to enter a reduced power consumption mode during the idle periods.

In another embodiment, a system may include a processor that may receive structured energy data associated with one or more assets in an automation system such that the structured energy data comprises a logical grouping of assets in the automation system. The processor may then determine energy properties of the one or more assets with respect to the logical grouping over a period of time, identify one or more peak demand periods of the one or more assets with respect to the logical grouping during the period of time based on the energy properties, determine an asset schedule configured to coordinate one or more operations of the one or more assets according to the logical grouping, wherein the operations are coordinated to reduce an energy demand of the automation system during the one or more peak demand periods, and send one or more commands to the one or more assets to reduce energy consumption according to the asset schedule.

In yet another embodiment, a system may include a processor that may receive structured energy data associated with one or more assets in an automation system such that the structured energy data comprises a logical grouping of assets in the automation system. The processor may then receive utility energy demand data indicating an energy demand schedule associated with a utility providing energy to the one or more assets, determine energy properties of the one or more assets with respect to the logical grouping over a period of time, determine an asset schedule configured to coordinate one or more operations of the one or more assets according to the logical grouping, wherein the operations are coordinated to reduce an energy demand of the automation system according to the utility energy demand data, and send one or more commands to the one or more assets to reduce energy consumption according to the asset schedule.

In yet another embodiment, a system may include a processor may receive structured energy data associated with one or more assets in an automation system such that the structured energy data comprises a logical grouping of assets in the automation system. The processor may then determine an expected range of energy associated with the one or more assets with respect to the logical grouping over a period of time, receive energy data from at least one of the assets in real time, and send a notification when energy data associated with the one or more assets with respect to the logical grouping falls outside the range.

In yet another embodiment, a system may include a processor that may receive structured energy data associated with one or more assets in an automation system such that the structured energy data comprises a logical grouping of assets in the automation system. The processor may then receive an asset schedule associated with one or more operations of the one or more assets over time and modify the asset schedule, wherein the modified asset schedule is configured to maintain an energy target for the automation system

DRAWINGS

These and other features, aspects, and advantages of the present invention will become better understood when the following detailed description is read with reference to the accompanying drawings in which like characters represent like parts throughout the drawings, wherein.

Figure 1:
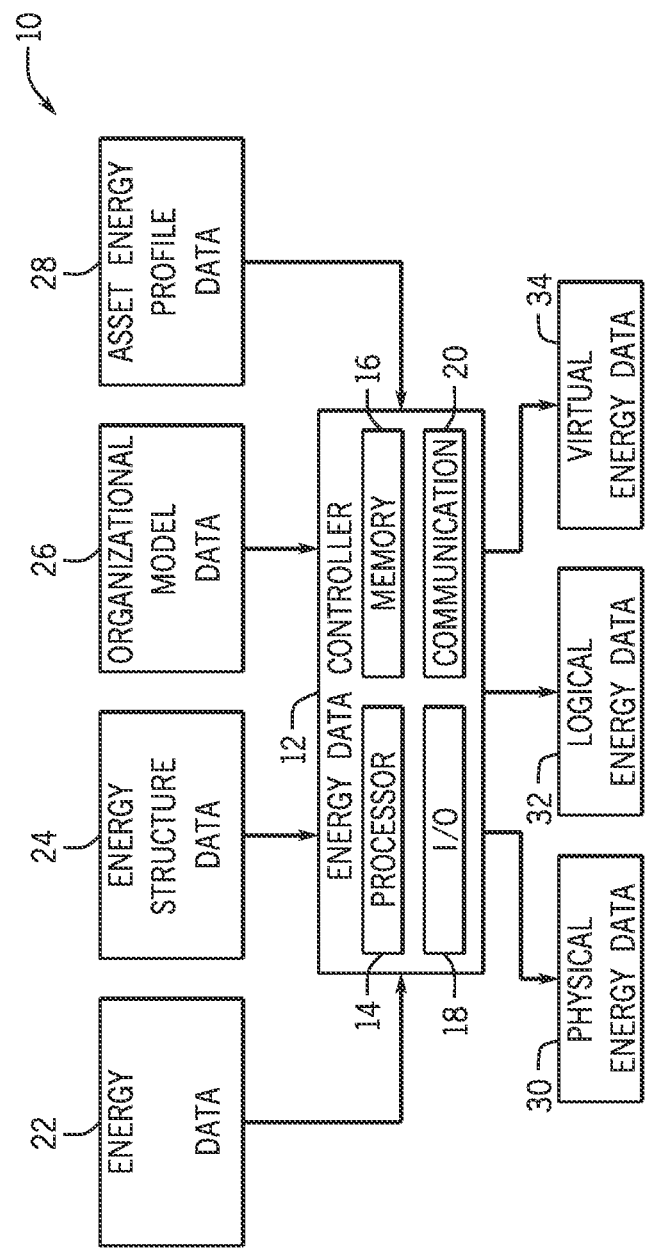
FIG. 1 is a block diagram of an energy management system for an industrial automation system, in accordance with an embodiment.
Figure 8:
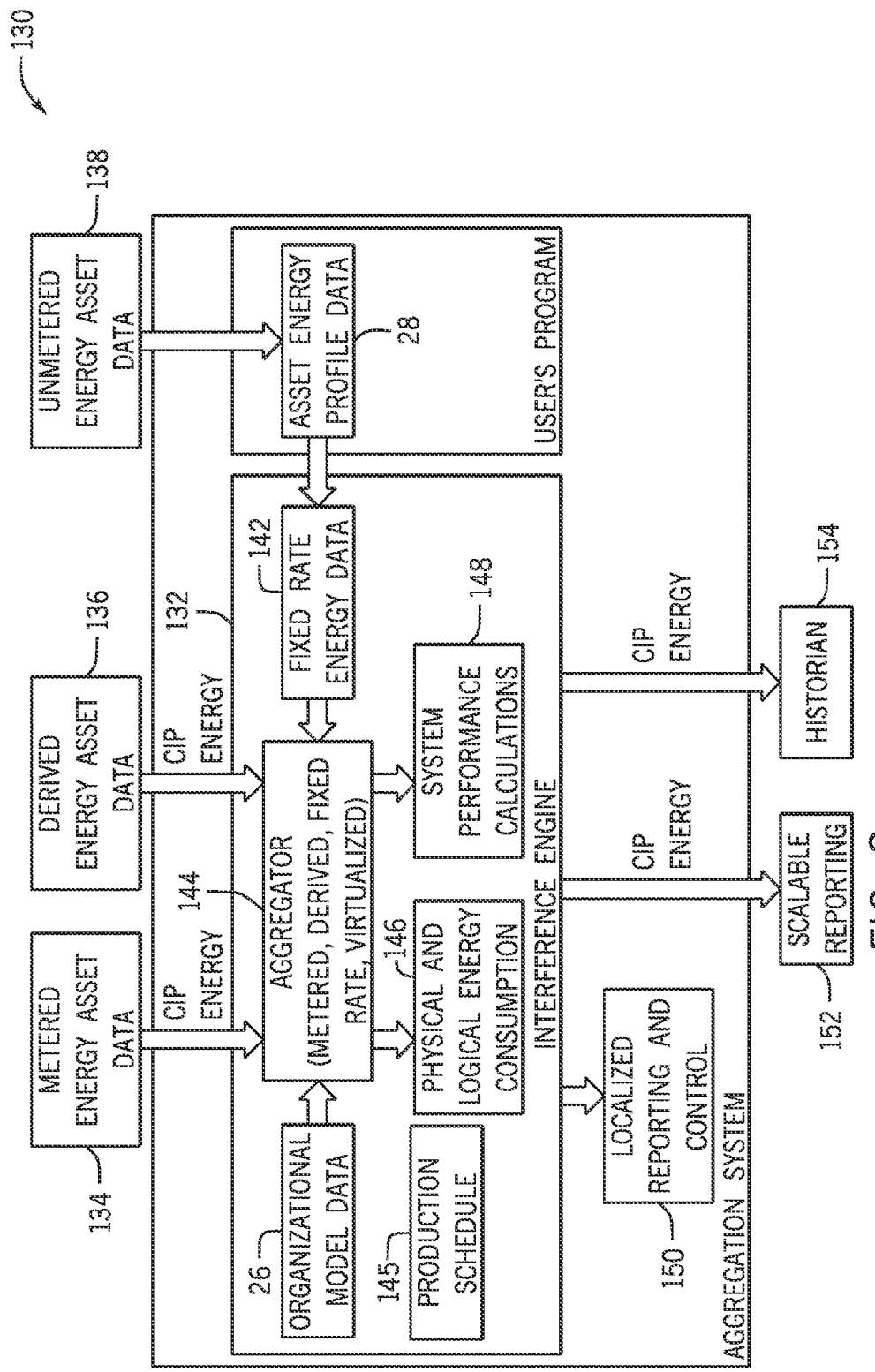
FIG. 8 is a block diagram of an energy inference engine that may be employed in the energy management system of FIG. 1, in accordance with an embodiment.
Figure 9:
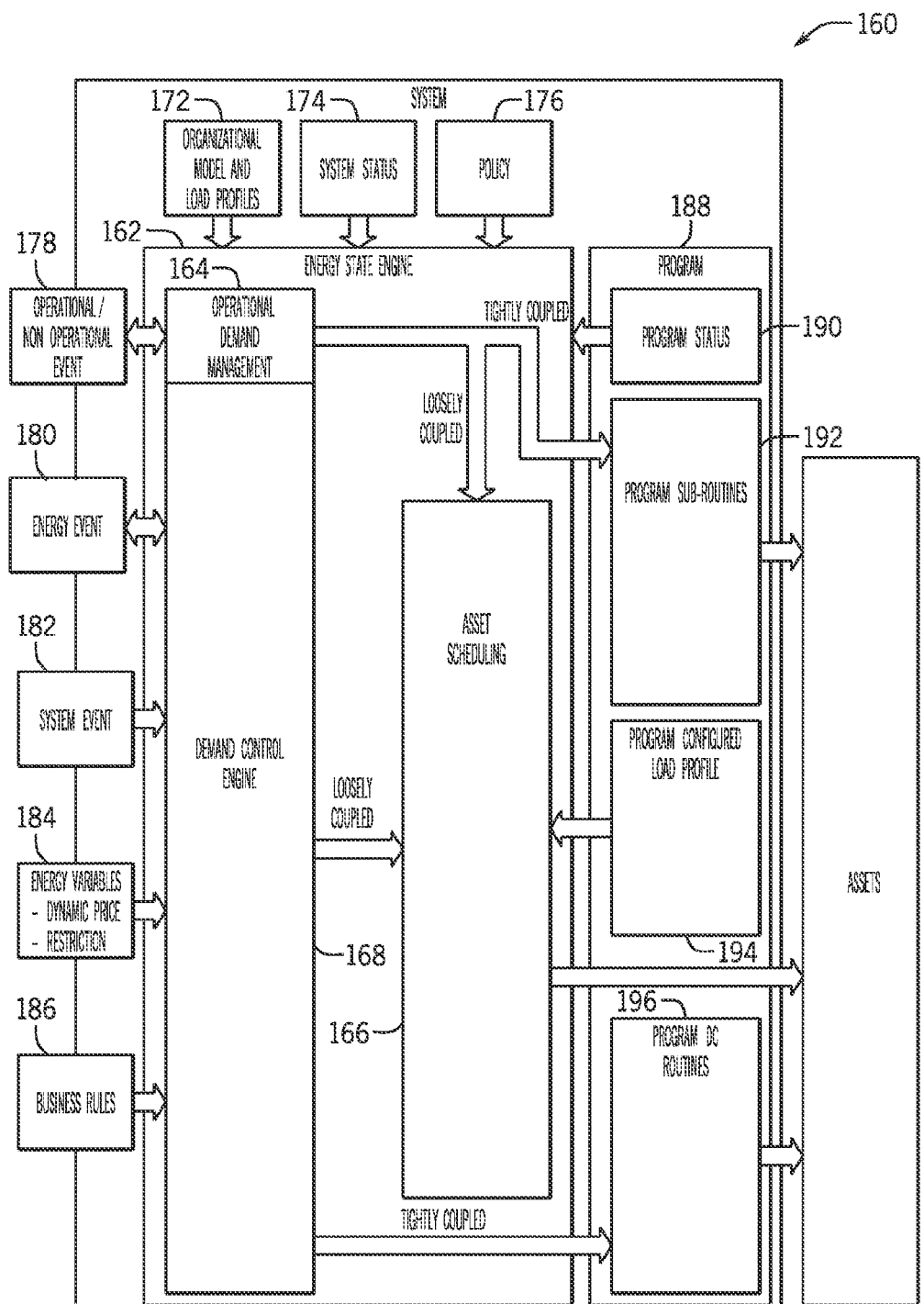
FIG. 9 is a block diagram of an energy state engine that may be employed in the energy management system of FIG. 1, in accordance with an embodiment.
Figure 14:
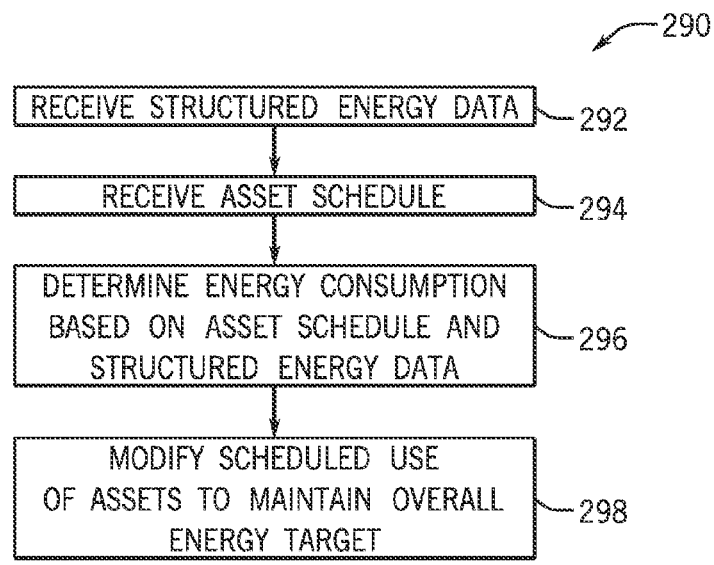
Figure 15:
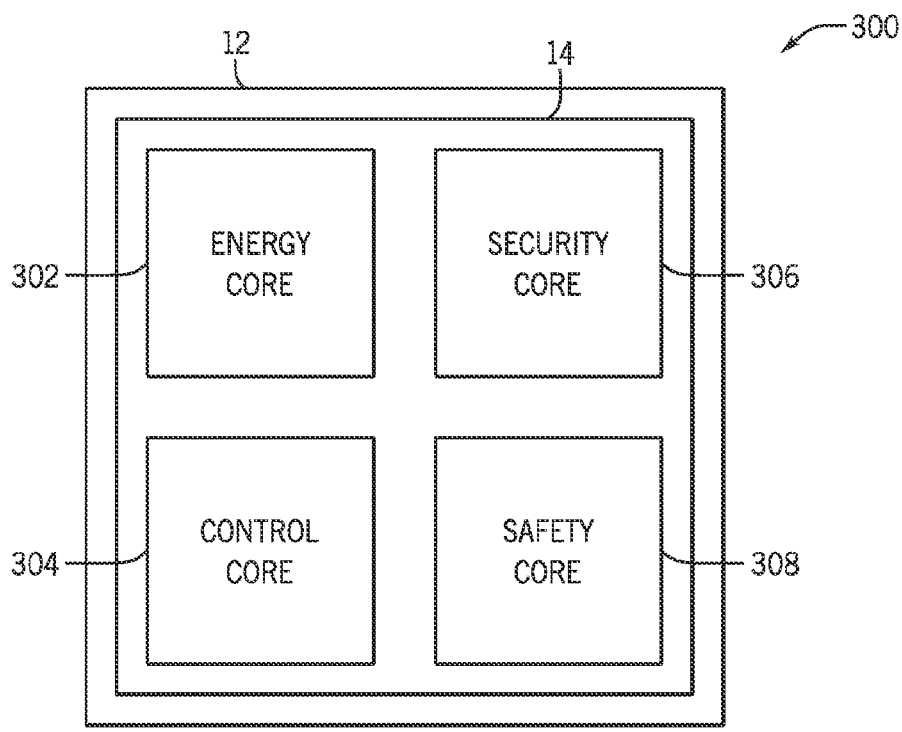

FIG. 14 is a flow chart of a method for modifying a scheduled use of assets in the industrial automation system based on a utility demand schedule and energy information determined by the energy inference engine of FIG. 8, the energy state engine of FIG. 9, or both, in accordance with an embodiment; and FIG. 15 is a block diagram of a multi-core processor that may be employed in the energy management system of FIG. 1, in accordance with an embodiment.

DETAILED DESCRIPTION

The present disclosure is generally directed towards leveraging an organizational model of an industrial automation system with energy data acquired from various assets or devices in the industrial automation system to better understand the energy consumption or production of the assets and various scalable areas within the industrial automation system. Generally, energy information acquired from any asset in the industrial automation system may not provide any details with regard to how its energy information may relate to the industrial automation system. That is, the energy information typically does not provide a context in which the energy information may be used with regard to the industrial automation system as a whole. Instead, the energy information is individualized with regard to a particular asset and may be used to know the energy being consumed at specific points in the industrial automation system; however, this information is not useful in understanding how the energy may be used more efficiently within the industrial automation system. By leveraging the organizational model with the acquired energy information, the presently disclosed systems and techniques may provide an industrial automation system-wide integrated architecture that may enable different processes, areas, and assets in the industrial automation system to be used in the industrial automation system-wide energy more efficiently.

By way of introduction, FIG. 1 depicts a block diagram of an energy management system 10 for an industrial automation system. Although the disclosure is described with reference to an industrial automation system, it should be noted that the systems and techniques described herein may be applied to any type of automation system. The energy management system 10 may include an energy data controller 12 that may be used to perform various techniques described herein. As such, the energy data controller 12 may include a processor 14, a memory 16, an input/output (I/O) component 18, a communication component 20, and the like. It should be noted that the energy data controller 12 may be an automation controller, a personal computer, a programmable logic controller, an energy controller, a work station, a cloud-based system, or any computing device.

The processor 14 may be any type of computer processor or microprocessor capable of executing computer-executable code. In certain embodiments, the processor 14 may include multiple cores such that each core may be used to perform different tasks. Additional details with regard to an embodiment of the processor 14 with multiple cores will be described in greater detail below with reference to FIG. 17. The memory 16 may be any suitable articles of manufacture that can serve as media to store processor-executable code. These articles of manufacture may represent computer-readable media (i.e., any suitable form of memory or storage) that may store the processor-executable code used by the processor 14 to perform the presently disclosed techniques. The I/O component 18 may include one or more ports that may enable the energy data controller 12 to connect to various types of computer media. The communication component 20 may be a wireless or wired communication component that may facilitate communication between various assets or controllers within the industrial automation system.

Referring back to the energy data controller 12, in certain embodiments, the energy data controller 12 may receive energy data 22, energy structure data 24, organizational model data 26, and asset profile data 28. The energy data 22 may include energy information acquired by various assets within the industrial automation system. For instance, the energy data 22 may include voltage and power usage information acquired from assets such as motor drives, variable frequency drives, soft starters, starters, power meters, motors, capacitor banks, air compressors, refrigerator units, turbines, generators, energy storage devices, photovoltaic cells, robots, reactors, and the like. In one embodiment, the energy data 22 may include energy information acquired from Common Industrial Protocol (CIP) energy objects disposed within the industrial automation system. As such, the energy data 22 acquired by various assets in the industrial automation system may be communicated or provided to the energy data controller 12.

Figure 2:
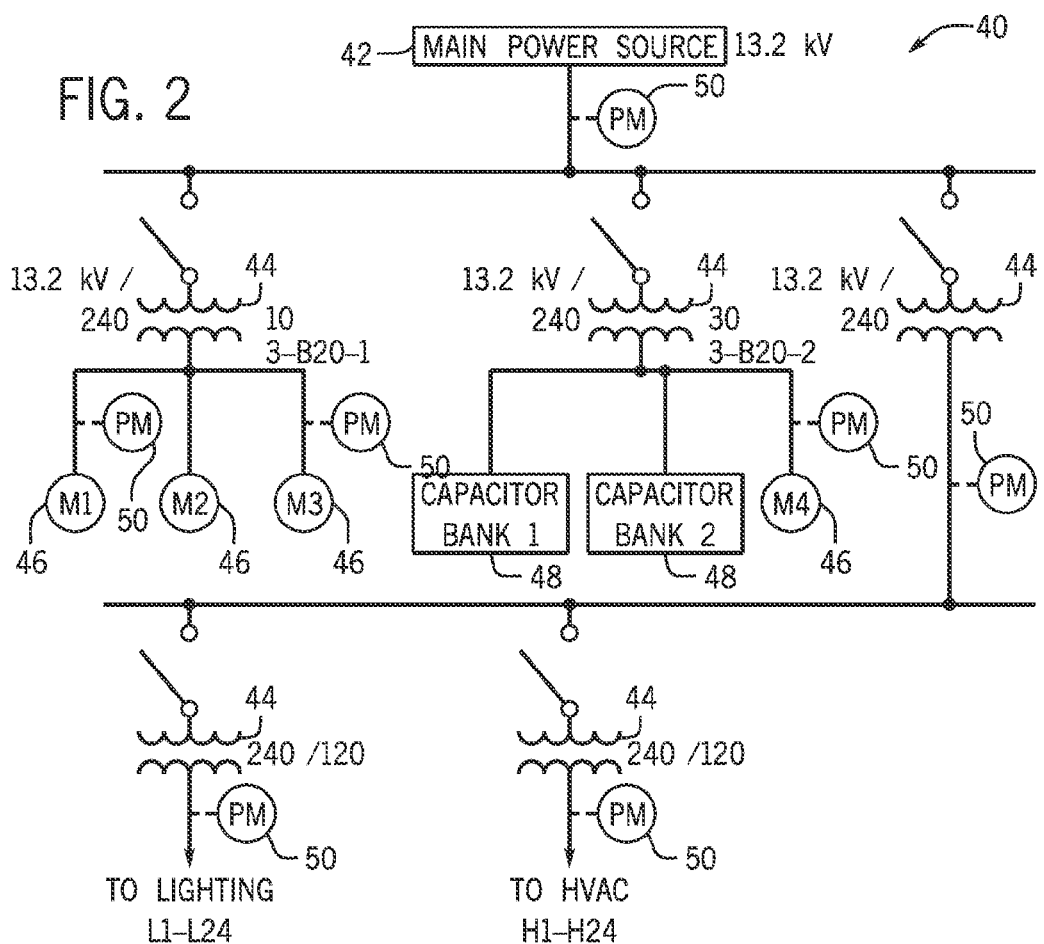
FIG. 2 is an example of a energy structure that may be used as an input for the energy management system of FIG. 1, in accordance with an embodiment.

In addition to the energy data 22, the energy data controller 12 may receive energy structure data 24 such as a one-line diagram, a power schematic, or the like. That is, the energy structure data 24 may include detail how power may be distributed to various assets in the industrial automation system. For example, FIG. 2 depicts an example of energy structure data in the form of a power distribution schematic 40. Referring to FIG. 2, the power distribution schematic 40 may include a main power source 42, a number of transformers 44, a number of motors 46, a number of capacitor banks 48, and a number of power meters 50. Generally, the power distribution schematic 40 illustrates how power from the main power source 42 may be distributed to each asset in the industrial automation system. However, although the power distribution schematic 40 may provide some details with regard to how energy may be consumed within the industrial automation system, the power distribution schematic 40 provides no context in which the energy is consumed with respect to how the industrial automation system is organized. In other words, the power distribution schematic 40 provides no information as to which asset is in use with particular process and areas within the industrial automation system.

Figure 3:
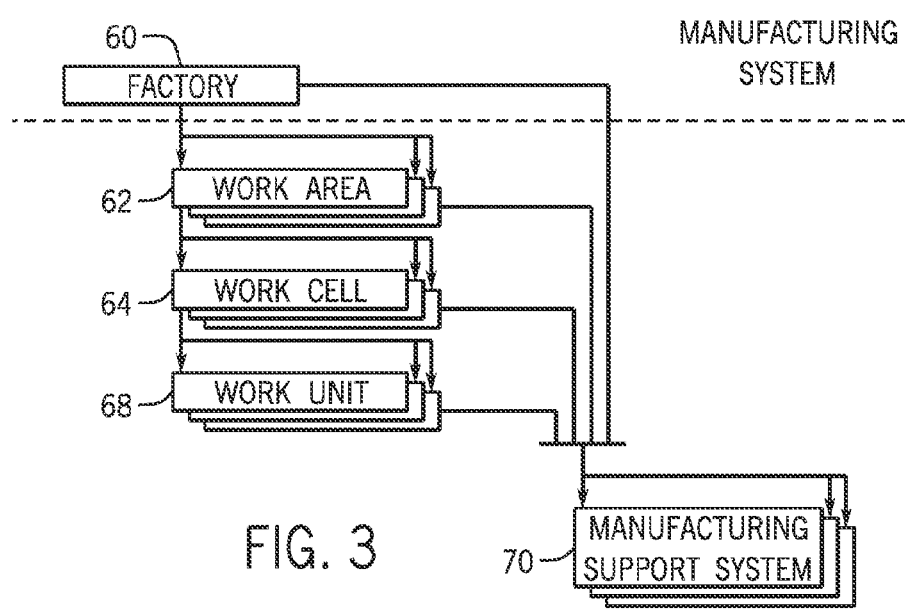
FIG. 3 is an example of an organizational model that may be used as an input for the energy management system of FIG. 1, in accordance with an embodiment.

Keeping this in mind, the energy data controller 12 may also receive organizational model data 26 that may indicate how the industrial automation system is organized. That is, the organizational model data 26 may provide a hierarchical structure of the automation system represented in a functional view with respect to the industrial automation system. As such, the organizational model data 26 may provide logical groupings of assets with respect to different areas (e.g., cells, lines, sites, or enterprises/batches, continuous processes, or discrete manufacturing processes/infrastructure, manufacturing support systems, sub-assembly/batch systems, or core manufacturing systems) of the industrial automation system. For instance, in a broad sense, FIG. 3 depicts an example of the organizational model data 26 that may illustrate one embodiment of how the industrial automation system may be organized. As such, the organizational model data 26 of FIG. 3 may include a factory 60 that may encompass all of the industrial automation system. The factory 10 may be divided into a number of work areas 62, which may, for example, include different production processes that use different types of assets. In one example, one work area may include a sub-assembly production process and another work area may include a core production process.

The work areas 62 may be subdivided into smaller units, work cells 64, which may be further subdivided into work units 68. Using the example described above, the sub-assembly production process work area may be subdivided into work cells 34 that may denote a particular team of individuals, a work shift time, or the like. These work cells 34 may then be further subdivided into work units 68 that may include individual assets (e.g., motors, drives, compressors) that may be used by the corresponding work cell 64. In certain embodiments, the factory 60, the work areas 62, the work cells 64, and the work units 68 may be communicatively coupled to a manufacturing support system 70, which may receive and monitor various data received from assets, controllers, and the like in the factory 60, the work areas 62, the work cells 64, and the work units 68. In addition to listing how the industrial automation system may be subdivided, the organizational model 26 may also detail how each work area 62, work cell 64, and work unit 66 may interact with each other. That is, each work area 62, for example, may be related to a particular process of a manufacturing process. As such, the organizational model 26 may detail which processes performed in certain work areas 62 may depend on other processes being completed in other work areas 62.

The organizational model 26 may also include information related to how each asset in the energy structure data 24 may relate to each area or subarea of the industrial automation system. Moreover, the organizational model 26 may include an energy profile for each asset used in the industrial automation system. The energy asset profile may include any energy relevant information with regard to the corresponding asset. For instance, the energy asset profile may indicate an amount of energy consumed by the asset when operating at full load, an amount of energy consumed during start up, stop, and idle times, and the like. The energy asset profile may also include information related to how much time may be involved in starting an asset, how much time may be involved in turning an asset off, how much time may be involved before an asset may be fully functional after a light curtain has been broken, and the like. The energy asset profile may be embedded within the asset itself such that the asset may provide its corresponding energy asset profile as part of its corresponding energy data 22.

In one embodiment, the energy asset profile may indicate a unit or parameter of measurement (e.g., watts, joules) in which the asset may provide energy information. The organizational model data 26 may thus include context with regard to how each asset may operate with respect to its energy. Moreover, since the organizational model data 26 may indicate a unit or parameter of measurement (e.g., watts, joules) for each asset in the industrial automation system, the organizational model data 26 may be used to standardize the energy measurements for each asset in the industrial automation system into a common unit.

Referring back to FIG. 1, if the organizational model data 26 does not include the energy asset profile for a particular asset, the energy data controller 12 may receive the corresponding asset profile via an asset profile data 28. As such, the asset profile data 28 may be stored in a database or the like and may include the energy asset profile for a number of assets that may be employed by the industrial automation system. In certain embodiments, the energy data controller 12 may query the database to find the asset profile data 28 for a particular asset based on the energy data 22, information from the energy structure data 26, information from the organizational model data 26, or the like.

Figure 4:
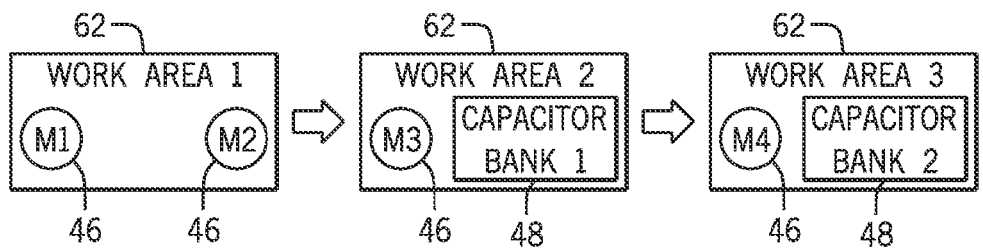
FIG. 4 is an example of logical energy data that may be output by the energy management system of FIG. 1, in accordance with an embodiment.

In any case, once the energy data controller 12 receive some or all of the energy data 22, the energy structure data 24, the organizational model 26, and the asset profile data 28, the energy data controller 12 may catalogue or categorize the energy data 22 with respect to the organizational model. For example, the energy data controller 12 may characterize how the energy data 22 may relate to the organizational model 26. FIG. 4 illustrates one example of how the energy data 22 acquired by some of the assets depicted in the power distribution schematic 40 may relate to the example organizational model 26 depicted in FIG. 3. As such, assuming that the energy data 22 include energy information related to the motors 45 (M1, M2, M3, and M4), energy information related to the capacitor banks 48 (1 and 2), the energy data controller 12 may use the received organizational model 26 to characterize or denote that the energy data 22 related to motors M1 and M2 correspond to work area 1, the energy data 22 related to the motor M3 and the capacitor bank 1 correspond to work area 2, and the motor M4 and the capacitor bank 2 correspond to work area 3.

In addition to indicating which assets may be used in various work areas 62, the organizational model 26 may indicate how each work area 62 may be related to each other. For instance, work area 1 may correspond to a pre-production process in a manufacturing process for a type of article of manufacturing. After the article of manufacturing is pre-processed in work area 1, the articles may be sent to work area 2 where the articles are sub-assembled together. The articles may then be sent to work are 3, which may include the core process for the manufacturing process.

By leveraging the energy data 22 with the organizational data 26, the energy data controller 12 may determine efficient ways in which assets in each work are 62 may operate. For example, if the assets in the work area 3 are operating above its full capacity rating while the assets in work areas 1 and 2 are each operating at 50% capacity, the energy data controller 12 may determine that an energy bottleneck may be present in work area 3. As such, the energy data controller 12 may scale down the energy consumption of the assets in work areas 1 and 2 such that the assets in work area 3 operate at its specified capacity. In this manner, the energy data controller 12 need not operate the assets in work areas 1 and 2 inefficiently and may instead save the energy consumed in work areas 1 and 2 such that the assets in work area 3 may not be overloaded.

Moreover, by leveraging the energy data 22 with the organizational data 26, the energy data controller 12 may categorize the received energy data 22 as physical energy data 30 or logical energy data 32 (i.e., structured energy data). Physical energy data 30 may include energy data that may be received directly from an asset and may indicate an amount of energy physically consumed by that particular asset. As such, the physical energy data 20 may correspond to energy data received via power meters 50 directly connected to the asset, CIP energy objects embedded within the asset, or the like. By categorizing energy as physical energy data 30, the energy data controller 12 may enable operators to know how many hours of operation that the asset may have been used, how much energy may have been consumed by the asset, and the like. As such, this information may help maintenance personnel keep track of how each asset should be maintained based on its actual usage data as opposed to random schedule/calendar checks.

The energy data controller 12 may generate the logical energy data 32 by aggregating the energy data 22 based on the organizational model 26. That is, the energy data controller 12 may aggregate the energy data 22 with respect to each area of the organizational model 26. In this manner, the logical energy data 32 may depict the energy consumed in each phase of the manufacturing process or in each area of the industrial automation system. The logical energy data 32 may then be used to analyze how energy is being consumed within the industrial automation system and between processes performed within the industrial automation system.

In certain embodiments, the energy data controller 12 may calculate energy data 22 for assets that may not provide energy data to the energy data controller 12. For instance, certain assets may not be equipped with energy detection technology that may be used to determine an amount of energy being consumed by the asset. Alternatively, the asset may not include communication technology that may enable it to communicate its energy data 22 to the energy data controller 12. In this case, the energy data controller 12 may use the energy data 22 received from known assets in the industrial automation system and cross reference that energy data 22 with the energy structure data 24 and the organizational model 26 to generate virtual energy data 34 (i.e., structured energy data) for the asset unable to provide energy information to the energy data controller 12. In one embodiment, the energy data controller 12 may use the energy structure data 24 to determine the relative position of the asset with respect to other assets that may have sent energy data 22. Further, the energy data controller 12 may use the organizational model data 26 to determine an energy profile for the respective asset. Using the relative position of the respective asset, the energy profile for the respective asset, and the energy data 22 associated with the assets surrounding the respective asset, the energy data controller 12 may predict energy (i.e., virtual energy data) being consumed by the respective asset.

In one embodiment, the energy data controller 12 may determine the virtual energy data 34 of a first part of the industrial automation system based on energy data 22 received from assets that may represent the energy of a second part of the industrial automation system and energy data 22 that may represent energy of both the first and second parts of the industrial automation system. For example, referring to FIG. 3, the energy data controller 12 may determine the energy data 22 related to the work area 1, which may be part of the first part of the industrial automation system, based on the energy data 22 received from a power meters 50 that may represent the energy of the work areas 2 and 3, which may be part of the second part of the industrial automation system, and the energy data 22 received from a power meter 50 that represents the energy of all three work areas. That is, the energy data controller 12 may aggregate the energy data 22 representing the energy of work areas 2 and 3 and subtract the resulting aggregation from the energy data representing the energy of all three work areas (1, 2, and 3) to determine the virtual energy 34 that represent work area 1.

Figure 5:
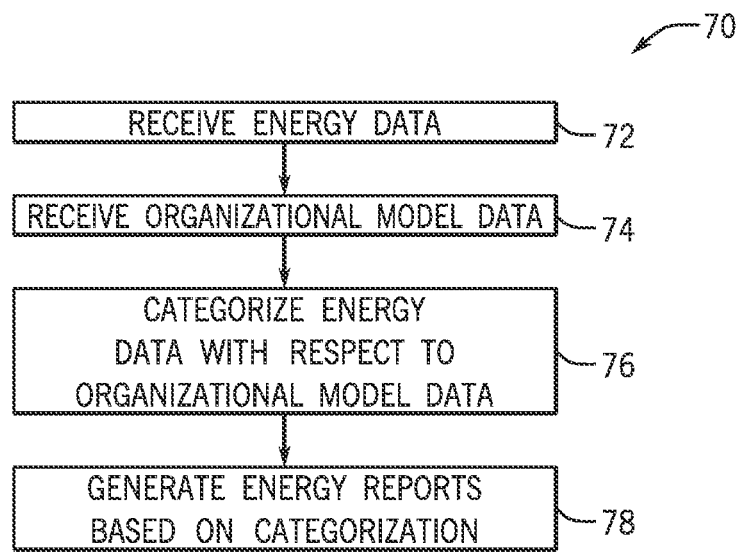
FIG. 5 is a flow chart of a method for categorizing energy data based on the organizational model that may be used as an input for the energy management system of FIG. 1, in accordance with an embodiment.
Figure 6:
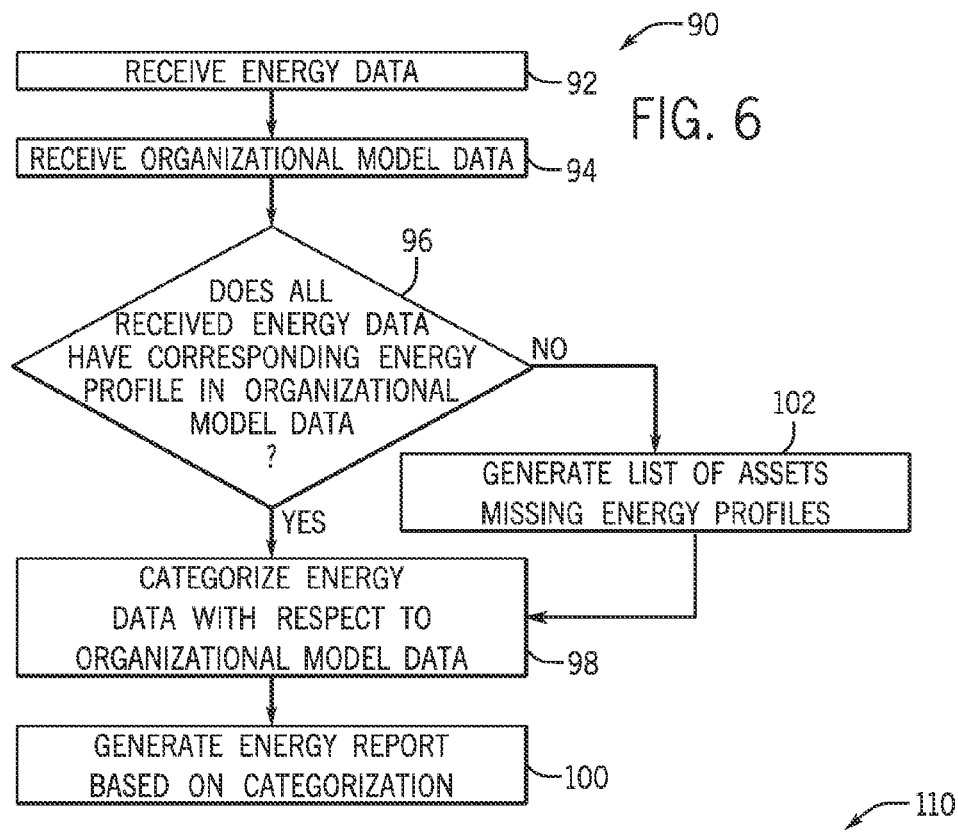
FIG. 6 is a flow chart of a method for identifying missing energy profiles for assets in the organizational model that may be used as an input for the energy management system of FIG. 1, in accordance with an embodiment.
Figure 7:
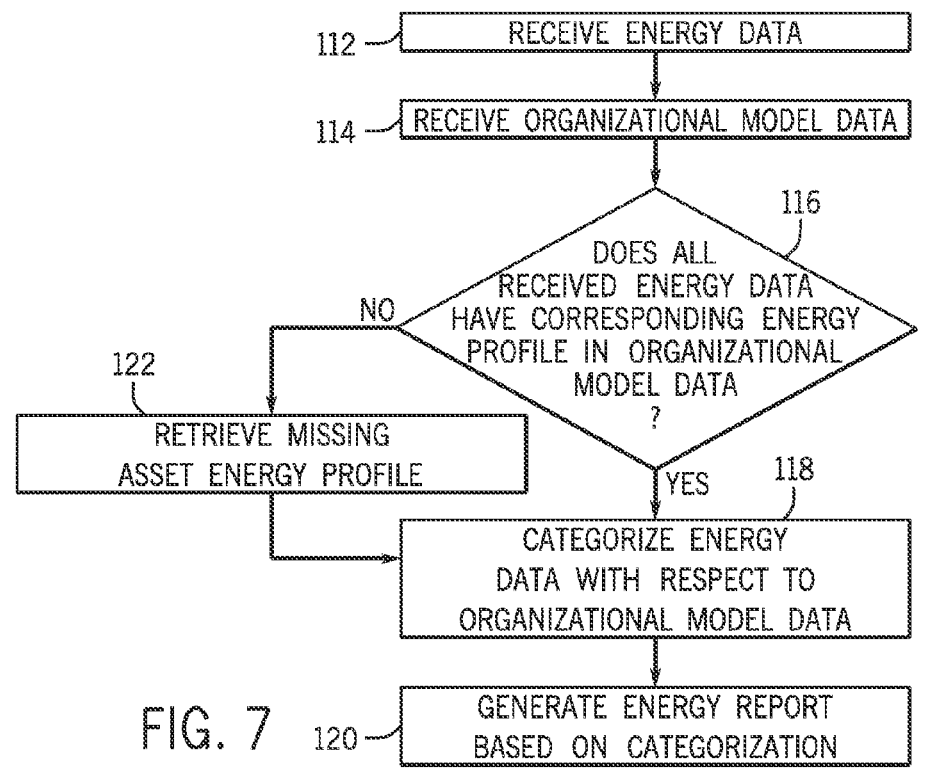
FIG. 7 is a flow chart of a method for retrieving energy profiles for assets missing energy profile data in the organizational model that may be used as an input for the energy management system of FIG. 1, in accordance with an embodiment.

Keeping the foregoing in mind, the energy data controller 12 may use the energy data 22, the energy structure 24, the organizational model 26, the asset profile data 28, the physical energy data 30, the logical energy data 32, the virtual energy data 34, and the like to generate various types of energy reports that may characterize how energy may be consumed in the industrial automation system. FIGS. 5-7, for example, depict certain embodiments of different methods that may be employed by the energy data controller 12 to generate various types of energy reports related to the industrial automation system.

Referring now to FIG. 5, the energy data controller 12 may generate an energy report based on categories as determined using the organizational model data 26 using method 70. Although the following description of the method 70 is described as being performed in a particular order, it should be noted that the method 70 is not restricted to the depicted order and may instead be performed in some other orders.

At block 72, the energy data controller 12 may receive the energy data 12 from assets that may be present in the industrial automation system. At block 74, the energy data controller 12 may receive the organizational model data 26 related to the industrial automation system. In certain embodiments, the energy data controller 12 may also receive the energy structure data 24 and the asset profile data 28 to supplement the energy reports that may be generated by the energy data controller 12.

In any case, at block 76, the energy data controller 12 may categorize the energy data 22 with respect to the organizational model data 26. As such, the energy data controller 12 may categorize the energy data 22 based on particular areas in the organizational model 26 where the energy data 22 may be located. In certain embodiments, the energy data controller 12 may also categorize the energy data 22 as physical energy data 30, logical energy data 32, or virtual energy data 34 based on information related to each asset as provided by the organizational model data 26, as described above.

At block 78, the energy data controller 12 may generate energy reports based on how the energy data 22 was categorized in block 76. That is, the energy data controller 12 may generate energy reports that may distinguish between physical energy data 30, logical energy data 32, and virtual energy data 34. Moreover, the energy reports may aggregate the energy data 22 according to particular work areas/cells/units in the industrial automation system, as indicated by the organizational model data 26. In one embodiment, the generated reports may be depicted in an energy dashboard or the like, which may display the energy properties of various work areas, work cells, and work units in the industrial automation system in real time.

By providing energy reports based on categorizations with respect to the organizational model data 26, the energy data controller 12 may better illustrate how individual work areas/cells/units consume energy and how the energy consumed by the individual work areas/cells/units may be related to other work areas/cells/units in the industrial automation system. Further, the energy reports may assist industrial automation system personnel allocate resources more efficiently based on how each area of the industrial automation system consumes energy with respect to production.

In certain embodiments, the organizational model data 26 may not include energy profiles for each asset provided in the organizational model data 26 or for each asset that provided energy data 22. In this case, the energy data controller 12 may provide a list of assets that may be missing energy profiles to an operator or another controller that may be associated with the industrial automation system. For instance, FIG. 6 illustrates a method 90 that may be used to generate a list of assets that may not have energy profiles provided within the organizational model data 26.

At block 92 and 94, the energy data controller 12 may receive energy data 22 and the organizational model data 26, respectively, as described above with respect to blocks 72 and 74 of FIG. 5. At block 96, the energy data controller 12 may determine whether each asset providing energy data 22 to the energy data controller 12 has a corresponding asset energy profile in the organizational model data 26. If the asset providing the energy data 22 to the energy data controller 12 has a corresponding asset energy profile in the organizational model data 26, the energy data controller 12 may proceed to block 98 and block 100. That is, the energy data controller 12 may categorize the energy data 22 with respect to the organizational model data 26 as described above with respect to block 76 of FIG. 5. In the same manner, the energy data controller 12 may proceed to block 100 after the energy data 22 has been categorized in block 98 as described above with respect to block 78 of FIG. 5.

Referring back to block 96, if the asset providing the energy data 22 to the energy data controller 12 does not have a corresponding asset energy profile in the organizational model data 26, the energy data controller 12 may proceed to block 102. At block 102, the energy data controller 12 may generate a list of the missing asset energy profiles. In one embodiment, the energy data controller 12 may then proceed to blocks 98 and 100 to categorize the energy data 22 that have corresponding asset energy profiles with respect to the organizational model data 26 and generate an energy report based on the categorizations. Here, the energy report may include a disclaimer or note that indicates that all of the energy data 22 received by the energy data controller 12 may not have been incorporated into the energy report. Alternatively, the energy data controller 12 may generate the energy report using only known energy data. As such, the report may include energy data for certain scaled areas within the organizational model data 26 if not all the energy data 22 for the assets with the scaled areas are known.

In certain embodiments, instead of generating a list of missing asset energy profiles, the energy data controller 12 may retrieve the missing asset energy profile from a database, the memory 16, or the like. For example, FIG. 7 depicts a method 110 that is similar to the method 90 depicted in FIG. 6. As such, blocks 112-120 in FIG. 7 correspond to blocks 92-100 in FIG. 6. However, if, at block 116 of FIG. 7, the asset providing the energy data 22 to the energy data controller 12 does not have a corresponding asset energy profile in the organizational model data 26, the energy data controller 12 may proceed to block 122 and retrieve the missing asset energy profile. That is, the energy data controller 12 may receive information indicating a type of asset that corresponds to the received energy data 22. Using this information, the energy data controller 12 may query a database, memory, or other digital storage unit to locate the asset energy profile that corresponds to the missing asset energy profile.

In one embodiment, the asset energy profile may be embedded within the corresponding asset and the energy data controller 12 may query the asset for its energy asset profile. In another embodiment, the energy data controller 12 may request or receive an update that may include the asset energy profile for the asset.

After retrieving the missing asset energy profile, the energy data controller 12 may proceed to block 118 and generate energy reports based the energy data 22 received at block 112 with respect to the organizational model data 26. Here, the energy data controller 12 may interpret the energy data 22 with respect to the asset energy profile data 28 retrieved at block 122. As such, the energy data controller 12 may interpret all of the energy data 22 in an appropriate context with respect to the organizational model data 26. Alternatively, if the energy data controller 12 did not receive the appropriate asset energy profile, the energy data controller 12 may generate the energy reports based on aggregations or known data related to scaled areas in the industrial automation system.

In addition to generating energy reports as described above, the energy data controller 12 may be used to control the operations of various assets based on the energy data 22 with reference to the organizational model data 26. As such, the energy data controller 12 may provide closed loop control for energy management of the industrial automation system. That is, the energy data controller 12 may monitor the energy consumption and demand of the industrial automation system and adjust or control the operations of various assets in the industrial automation system based on the demand.

Keeping this mind, FIG. 8 illustrates an aggregation system 130 that uses an energy inference engine 132 to calculate confidence values for physical energy data 30, logical energy data 32, and virtual energy data 34. As such, the energy data controller 12 may determine how to control the various assets in the industrial automation system based on the confidence values associated with the interpreted energy data. Generally, the inference engine 132 may receive the organizational model data 26, a metered energy asset data 134, derived energy asset data 136, unmetered energy asset data 138, a production or operational schedule 145, or the like. The metered energy asset data 134 may include energy data that may be metered by a CIP energy object associated with an asset or the like. The metered energy asset data 134 may also be acquired from various types of meters such as power meters, flow meters, and the like. In addition to the energy data that may be metered or measured, the metered energy asset data 134 may include a confidence value related to the determined accuracy (e.g., +/−5%) of the metered or measured data.

The derived energy asset data 136 may also be provided by a CIP energy object, which may have calculated or derived the derived energy asset data 136 based on energy data received from other CIP energy objects and the like. As such, the derived energy asset data 136 may include energy data for assets such as drives, overload pumps, fans, mixers, work cells, and the like. That is, the derived energy asset data 136 may include energy data calculated for assets that do not have the ability to measure its energy properties. Instead, the derived energy asset data 136 may be calculated based on the asset energy profile for the corresponding asset, as indicated in the organizational model data 26 or the like, the energy structure data 24, and data that may represent certain electrical characteristics (e.g., voltage input, current output) related to the corresponding asset that may be used to derive energy data. For instance, if a drive is located between a transformer that outputs 500 volts and a motor that conducts 300 amps of current, the derived energy asset data 136 may derive the energy data that corresponds to the drive that may not provide energy data to the energy inference engine 132.

In one embodiment, if a drive is located between a transformer that outputs 500 watts of power and a motor that consumes 300 watts of power, and the asset energy profile 28 for the corresponding asset indicates that the asset consumes between 100 and 300 watts of power when in service, the derived energy asset data 136 may denote that the drive consumes 200 watts of power (virtual energy). In any case, the derived energy asset data 136 may be associated with a confidence value that may be determined based on the confidence values related to the information used to generate the derived energy asset data 136.

The unmetered energy asset data 138 may include other energy data received from various assets in the industrial automation system that may not have any metering capabilities such as motor starters, relays, lighting and the like. However, these assets may have fixed rate energy consumption properties, which may be listed in its corresponding asset energy profile data 28. As such, the unmetered energy asset data 138 may include information that specifies a type of asset (e.g., product name, version, serial number) and its usage information. The usage information may relate to how many hours that the device has been in service or the like. In this manner, the aggregator 144 may identify the asset energy profile data 28 that corresponds to the asset providing the unmetered energy asset data 138 based on the information that specifies a type of asset. The fixed rate energy data 142 may then be determined from the asset energy profile data 28 and may be used with the usage information specified by the unmetered energy asset data 138 to determine the energy consumed by the unmetered asset. Like the metered energy asset data 134 and the derived energy asset data 136 described above, the fixed rate energy data 142 may also be associated with a confidence value that may denote the expected accuracy of the fixed rate energy data.

In one embodiment, an aggregator 144 may determine the fixed rate energy data as described above. Moreover, the aggregator 144 may receive the organizational model data 26, the metered energy asset data 134, the derived energy asset data 136, the fixed rate data 142, and a production or operational schedule 145. The aggregator 144 may then use these inputs to determine updated confidence values for the metered energy asset data 134, the derived energy asset data 136, the fixed rate energy data 142, and the like. Using the received confidence values related to the metered energy asset data 134, the derived energy asset data 136, the fixed rate energy data 142, along with the organizational model data 26 and the operational schedule 145, the aggregator 144 may update the confidence values for the metered energy asset data 134, the derived energy asset data 136, the fixed rate energy data 142 by checking a first type of data associated with a first group of assets with respect to a second type of data associated with a second group of assets that may be related to the first group of assets according to the organizational model data 26.

For example, referring to FIG. 4, the aggregator 144 may receive a first derived energy asset data 136 from the motor M1. The first derived energy asset data 136 may include a first confidence value associated with the energy data in the first derived energy asset data 136. The aggregator 144 may then receive a second derived energy asset data 136 from the motor M2. The second derived energy asset data 136 may also include a second confidence value associated with the energy data in the second derived energy asset data 136. The aggregator 144 may then determine how the first derived energy asset data 136 and the second derived energy asset data 136 may be associated with a logical grouping (e.g., work area, line, etc.) as per the organizational model data 26. Here, the aggregator 144 may determine that the first derived energy asset data 136 and the second derived energy asset data 136 may both be associated with one particular logical grouping as per the organizational model data 26. The aggregator 144 may then determine the energy data associated with the identified logical grouping by aggregating the energy data in the first derived energy asset data 136 and the second derived energy asset data 136. In addition, the aggregator 144 may also determine a confidence value for the aggregated data (i.e., the energy data associated with the identified logical grouping) based on the confidence values associated with the first derived energy asset data 136 and the second derived energy asset data 136. As such, the aggregator 144 may determine the confidence value for the aggregated data may be determined using various statistical techniques and the like.

Keeping this example in mind, the aggregator 144 update the confidence value for the aggregated data using additional energy data (e.g., metered energy data) that may be associated with the energy of the same logical grouping. For instance, referring to FIG. 4 again, if a power meter was available measuring the energy related work area 1, the aggregator may use the metered energy asset data 134 from the power meter to update the confidence value for the aggregated data. That is, the aggregator 144 may verify or check the derived asset energy data 136 and its corresponding confidence value associated with the logical grouping against the metered energy asset data 134 and its corresponding confidence value. As a result, the aggregator 144 may update the confidence value of the derived asset energy data 136.

Keeping this example still in mind, the aggregator 144 may determine a confidence value associated with virtual energy data 34. The is, the aggregator 144 may determine the confidence value associated a logical grouping according to the organizational model data 26 that the aggregator 144 may not have any energy data related thereto. For instance, if the aggregator received metered energy asset data 134 and its corresponding confidence value for all of the energy associated with both work areas 1 and 2, the aggregator 144 may used the derived energy asset data 136 associated with work area 1 to verify the virtual energy asset data 138 associated with work area 2. As such, the aggregator 144 may receive metered energy asset data 134 from a power meter or the like that may measure the energy associated with work areas 1 and 2, which may both be part of a higher level (i.e., scaled) logical grouping of the industrial automation system according to the organizational model data 26. In one embodiment, the aggregator 144 may have determined the virtual energy asset data 138 associated with the work area 2 because the energy data related to work area 2 may have been unknown to the aggregator 144. However, using the were part of a second logical grouping together according to the metered energy asset data 134 and its corresponding confidence value for all of the energy associated with both work areas 1 and 2 and the derived energy asset data 134 and its corresponding confidence value for the energy associated with work area 1, the aggregator 144 may verify the virtual energy asset data 138 associated with the work area 2. Moreover, the aggregator 144 may update the original confidence value associated with the virtual energy asset data 138 for work area 2 based on the confidence values for the derived energy asset data 136 associated with work area 1 and the metered energy asset data 134 associated with work areas 1 and 2.

In one embodiment, the aggregator 144 may also update the confidence value associated with the metered energy asset data 134, the derived energy asset data 136, the fixed rate energy asset data 142, or the like using operational status information related to the assets associated with the metered energy asset data 134, the derived energy asset data 136, the fixed rate energy asset data 142, or the like. The operational status information may include information detailing the current operating status of an asset (e.g., operating at full load, off) or the historical operating status of the asset (e.g., scheduled use of the asset over time). In certain embodiments, the operational status information may be received via the production or operational schedule 145.

Referring again to FIG. 4, the aggregator 144 may receive metered energy asset data 134 related to motor M1. The aggregator 144 may then use the operational status history of M1 according to the production or operational schedule 145 to verify the energy data provided by the metered energy asset data 134. As a result of the verification, the aggregator 144 may also update the confidence value associated with the metered energy asset data 134 related to motor M1. In one embodiment, the aggregator 144 may use the operational status in combination with the corresponding asset profile data 28, which may be provided by the organizational model data 26 or retrieved as described above.

In yet another embodiment, the aggregator 144 may verify the virtual energy asset data 138 and its corresponding confidence value based on energy data associated with a logical grouping of known energy data and the virtual energy asset data 138. For example, referring again to FIG. 4, the aggregator 144 may receive derived energy asset data 136 and its corresponding confidence value associated with motor M1 and may determine virtual energy asset data 138 and its corresponding confidence value associated with motor M2. The aggregator 144 may also receive metered energy asset data 134 and its corresponding confidence value associated with the work area 1, as defined according to the organizational model data 22. Using the organizational model data 22, the aggregator 144 may determine that motor M1 and motor M2 may both be present in the work area 1. Moreover, using the operational status of motor M1 and motor M2 as received from the production or operational schedule 145 along with the asset profile data 28 for the motor M1 and the motor M2, the aggregator 144 may verify the accuracy of the virtual energy asset data 138 for the motor M2, and thereby updating the confidence value associated with the virtual energy asset data 138.

Although the examples described above have been made with specific references to specific types of data (i.e., metered, derived, or virtual), it should be noted that the aggregator 144 may be used to update the confidence value of any type of energy data using the same processes described above. Moreover, after updating the confidence values for any type of data, the energy data controller 12 may make operational decisions with respect to the industrial automation system or any asset in the industrial automation system based on the updated confidence value. For example, the energy data controller 12 may send a command to certain assets to perform an action when a certain confidence value is above or below a certain threshold.

Additionally, the aggregator 144 may determine physical energy data 30, logical energy data 32, or virtual energy data 34 (e.g., physical and logical energy consumption 146) for various scalable parts of the industrial automation system with respect to the organizational model data 26 based on the energy data that corresponds to the metered energy asset data 134, the derived energy asset data 136, the fixed rate energy data 142. The aggregator 144 may also determine system performance calculations 148, which may be used to determine how the industrial automation system may be performing. In particular, the system performance calculations 148 may indicate how each work area 62 or the like in the industrial automation system may be operating in real time. The system performance calculations 148 may detail how the assets may perform with respect to their energy data or the energy data of a group in which they are part of with respect to the organizational model data 22.

In addition to organizing the received energy data, the inference engine 132 may output the metered data, derived data, fixed rate data, and virtual data (i.e., load profiles) as localized reports 150, which may be used to control the assets in the industrial automation system. The inference engine 132 may also provide information related to various areas of the industrial automation system or the industrial automation system as a whole to a scalable reporting component 152, which may use the provided information to provide larger scale reports and the like. Further, the inference engine 132 may output all of its findings (e.g., physical and logical energy consumption 146, system performance calculations 148) to a database (e.g., historian 154) such that data related to the history of the industrial automation system is stored.

Keeping the foregoing in mind, the organizational model data 26 and the load profiles determined by the inference engine 132 may be used by an asset demand control system to control the operations of assets in the industrial automation system based on demand data related to the assets being used in the industrial automation system. For instance, FIG. 9 illustrates an asset demand control system 160 that may use an energy state engine 162 to coordinate the use of assets in the industrial automation system based on the energy demand on the assets. As such, in one embodiment, the energy data controller 12 may employ the asset demand control system 160 to control the various assets in the industrial automation system based on various energy demand provisions.

The energy state engine 162 may employ an operational demand management component 164, a demand control engine 166, and an asset scheduling component 168 to control the assets in the industrial automation system based on the corresponding energy demand on the assets. These components may be used to coordinate the operations of assets that may be communicatively coupled to assets 170 in the industrial automation system. The assets 170 may include any type of asset that may be employed in the industrial automation system including various loads, machines, and the like. Further, the energy state engine 162 may control the manner in which the assets 170 may operate with respect to other assets 170 in machine-to-machine relationships, other assets 170 in the same work cell, other assets 170 in the facility, and the like. That is, the energy state engine 162 may coordinate the operations of the assets 170 to manage the energy consumption and production along with the demand of the assets by controlling the assets on an individual machine basis, a machine-to-machine basis, a work cell basis, a facility basis, and the like.

In certain embodiments, the energy state engine 162 may receive inputs such as organizational model and load profiles 172, system status 174, and policy 176. The organizational model and load profiles 172 may include the organizational model data 26 and the load profiles as determined by the inference engine 132 described above. The system status 174 may include information related to the status of the industrial automation system, which may indicate that the operational capability of the industrial automation system, whether parts of the industrial automation are not fully functional or fully staffed, or the like. The policy 176 may denote an energy policy to govern the operations of the industrial automation system. For instance, the policy 176 may provide specifications that indicate that the industrial automation system should operate at full capacity, in an energy savings mode, operating only critical processes, and the like.

The energy state engine 162 may use the organizational model and load profiles 172, the system status 174, and the policy 176 inputs in addition to inputs provided to the operational demand management component 164, the demand control engine 166, and the asset scheduling component 168 to manage the use of the assets 170 with respect to the energy consumed by the assets 170. Referring now to the operational demand management component 164, the operational demand management component 164 may analyze operational and non-operational events 178 and provide information related to these events to the asset scheduling component 168. The operational and non-operational events 178 may include events when assets in the industrial automation system may be operating and when they may not be operating. For instance, the operational and non-operational events 178 may include times during which corresponding assets are not operating due to scheduled breaks (e.g., lunch) for personnel operating the assets, shift changes for the personnel, product line changes, and the like. In one embodiment, the operational and non-operational events 178 may be pre-defined according to a master schedule or the like. Alternatively, an operator may input new operational and non-operational events 178 such that the operational demand management component 164 may integrate the new operational and non-operational events 178 into the existing operational and non-operational events 178.

In any case, the operational demand management component 164 may provide the operational and non-operational events 178 to the asset scheduling component 168 such that the asset scheduling component 168 may incorporate the operational and non-operational events 178 into a schedule for each asset related to the operational and non-operational events 178. The asset scheduling component 168 may include a detailed schedule of how each asset in the industrial automation system will be used. For instance, the asset scheduling component 168 may include a predefined schedule for interlocking various assets, shedding the use of various assets, and the like.

Moreover, the asset scheduling component 168 may dynamically adjust the schedule of how assets may be placed in service based on newly received information or data (e.g., operational and non-operational events 178). For example, the asset scheduling component 168 may dynamically interlock assets or shed assets based on load profiles (i.e., received from inference engine 132), learned/adaptive energy pattern recognitions of the assets, predictive energy models for the assets, newly discovered assets, and the like. As such, the asset scheduling component 168 may dynamically adjust the schedule of how assets may be placed in service by modifying the current use of the assets to meet an energy policy defined by the policy 176 or the like.

The asset scheduling component 168 may also incorporate a rule based schedule that indicates when the highest energy consuming assets may be placed in service, when non-essential assets may be taken offline, and the like. Moreover, the asset scheduling component 168 may also include system routines that may define how processes in the industrial automation system may be performed. For instance, the system routines may indicate how the work areas 62 relate to each other with respect to a production process. As such, the scheduling component 168 may perform system modulations such that different portions of the production process may be performed at different times to accommodate various energy demands, policies, and the like.

The system routines may also include an energy exchange protocol that may enable the asset scheduling component 168 to exchange energy between assets. That is, the asset scheduling component 168 may use production processes in the industrial automation system as a means to store energy or consume less energy. That is, the asset scheduling component 168 may shift the production schedule and adjust the scheduled use of the assets 170 to conserve energy when bottlenecks in production or energy have been identified. In this manner, the asset scheduling component 168 may use work-in-progress (WIP) processes as a battery to store energy as a battery. As a result, the asset scheduling component 168 may enable the industrial automation system to operate more energy efficiently without sacrificing production productivity.

In one embodiment, the asset scheduling component 168 may recognize energy patterns based on the organizational model and the load profiles 172. That is, the asset scheduling component 168 may analyze the load profiles for each asset over time and leverage the load profiles with the organizational model data 26 to identify patterns of energy use or model the energy of the industrial automation system within different work areas 62, work cells 64, and work units 66 of the industrial automation system. After identifying the energy patterns of the assets 170, the asset scheduling component 168 may dynamically adjust the schedule of how assets may be placed in service such that the energy patterns by the assets 170 may meet energy patterns specified by the policy 176 or the like.

In addition to or in lieu of specifying energy patterns for the assets 170, the policy 176 may specify the energy demand schedule of the assets 170 of the industrial automation system. The energy demand schedule of the assets 170 may include a schedule that specifies the amount of energy demanded by the assets 170 over time. As such, the energy state engine 162 may control the use of the assets 170 to meet the energy demand schedule specified by the policy 176.

To manage and control the operations of the assets 170 with respect to energy demands, the demand control engine 166 may provide various types of energy demand information to the asset scheduling component 168 such that the asset scheduling component 168 may schedule the use of the assets 170 based on the energy demand information. Generally, the energy demand information may provide guidelines in which the assets 170 in the industrial automation system should operate under various energy demand scenarios. For instance, the demand control engine 166 may include an energy demand management plan that may detail a schedule of energy demand for each asset 170 over time.

The demand control engine 166 may also include an energy demand response plan that may provide provisions to shed energy consumptions when energy demands of the assets 170 exceed some threshold. In the same manner, the energy demand response plan may also provide provisions to provide regenerative energy back to the utility when energy demands of the assets 170 are below some threshold.

The demand control engine 166 may also include a dynamic energy price management plan that may provide guidelines to operate the assets 170 based on dynamic energy pricing. For example, energy usage in certain hours of the day, month, or year may have higher utility costs as opposed to other hours. As such, the dynamic energy price management plan may specify how the assets 170 should be scheduled in accordance with the dynamic energy prices such that the industrial automation system efficiently meets its production goals while minimizing energy costs.

In determining the demand management plan, the demand response plan, the dynamic price management plan, the demand control engine 166 may use certain inputs such as energy event 180, system event 182, energy variables 184, and business rules 186. The energy event 180 may include information related to an energy demand such as a large energy demand as indicated by the utility or the like. That is, the utility may provide information indicating that the utility may experience a large energy demand during certain hours of a day (e.g., hours when temperatures are expected to be extremely high). As such, the demand control engine 166 may determine how to reduce the energy demand of the assets 170 during the hours that the utility may experience the large energy demand. In one embodiment, the demand control engine 166 may provide energy demand information or asset use determinations to the asset scheduling component 168, and the asset scheduling component 168 may modify the use of assets 170 based on the energy demand information or the asset use determinations.

In another embodiment, the demand control engine 166 may negotiate or communicate b-directionally with the provider of the energy event 180 to determine a demand management plant to meet the energy event 180. As such, the demand control engine 166 may send a request to the asset scheduling component 166 or the like to modify the operations of the assets 170 to meet the demand according to the energy event 180. In one embodiment, the demand control engine 180 may request that the asset scheduling component 166 or the like may cause the assets 170 to produce energy to provide back to the grid.

When negotiating, the demand control engine 168 may provide information to the utility or the like related to the energy capabilities of the assets 170 or the energy data related to parts of the industrial automation system according to the organizational model data 172. The utility and the demand control engine 164 may thus negotiate together to determine a way to minimize an adverse impact of the energy event 180 based on the capabilities of the assets 170 and the utility.

The system event 182 may include information related to an event in during the production process in the industrial automation system that may demand a higher than expected amount of energy. For instance, production in the industrial automation system may be increased to meet various production goals or the like. In this case, the demand control engine 166 may specify to the asset scheduling component 168 that the energy demand of the assets 170 will increase above expected levels due to the information provided in the system event 182. The asset scheduling component 168 may then, in turn, modify the scheduled use of the assets 172 to meet the energy demand details as provided by the demand control engine 184. Like the energy event 180, the demand control engine 168 may negotiate with the provided of the system event 182 to determine an efficient way to resolve the system event 182 together, as described above.

Another input that may modify the energy demand schedule of the assets 170 may include the energy variables 184. The energy variables 184 may include information related to a dynamic price schedule for the use of energy from the utility, a restriction on the use of a certain amount of energy from the utility, or the like. Here, the demand control engine 166 may determine how to minimize the energy consumption of the assets 170 based on the dynamic price schedule. The asset scheduling component 168 may then modify the scheduled use of the assets 172 to meet the energy demand details as provided by the demand control engine 184.

Yet another input that may be used by the demand control engine 166 may include the business rules 186. The business rules 186 may detail how various energy demand scenarios may be handled by the demand control engine 166. As such, the business rules 186 may include any type of energy demand rule as specified by an operator of the industrial automation system. For example, the business rules 186 may include providing an average overall energy consumption value for the industrial automation system over a specified amount of time. As such, the demand control engine may determine how energy demands of the assets 170 relate to the average overall energy value and may specify to the asset scheduling component 168 to increase or decrease the energy of the assets 170 to meet the average overall energy value. In another embodiment, the business rules may provide a depreciation schedule for each asset 170. As such, the demand control engine 168 may send commands to the assets scheduling component 166 to operate the assets 170 according to the depreciation schedule or based thereon.

As mentioned above, the demand control engine 166 may communicate with the asset scheduling component 168 to control the energy of the assets 170. As such, the asset scheduling component 168, in certain embodiments, may be communicatively coupled to the assets 170 such that the energy or the use of the assets 170 may be controlled directly by the asset scheduling component 168. Generally, however, a program 188 may control the operations of the assets 170.

The program 188 may be a program that may provide a user interface or the like to operate one or more of the assets 170. In certain embodiments, one program 188 may be associated with each type of asset 170 (e.g., drives, motors). In other embodiments, one program 188 may interface with multiple types of assets and thus may be used to control the multiple types of assets. As such, an operator of the industrial automation system may program or control the operations of the assets 170 using the program 188.

In the asset demand control system 160, however, the program 188 may interface with the energy state system 162. More specifically, various components within the program 188 may interface with the operational demand management component 164, the demand control engine 166, and the asset scheduling component 168.

Keeping this in mind, the program 188 may include a program status component 190, program sub-routines component 192, program configured load profile component 194, and program demand control (DC) routines component 196. The program status component 190 may indicate the status of the program such as whether the program is active, operational, and the like. In one embodiment, the program status component 190 may indicate the current state of one or more of the assets 170 or the current state of each of the components within the program 190. As such, the energy state engine 162 may know the current operations of each asset 170 or the program 188.

The program sub-routines component 192 may include computer-executable instructions or subroutines that may be defined to support when the assets 170 may schedule breaks (e.g., lunch), end of shifts, a product line change over, and the like. As such, in one embodiment, the operational demand management component 164 may interface directly with the program sub-routines component 190 to incorporate the operational/non-operational event data 178. The program sub-routines component 192 may then implement the changes to the scheduled control of the assets 170 based on the information provided by the operational demand management component 164.

The program configured load profile component 194 may indicate how each load or asset 170 may be configured. That is, the program configured load profile component 194 may indicate which of the assets 194 may be deemed critical or non-critical to certain production processes being performed in the industrial automation system. Moreover, the program configured load profile component 194 may also indicate which of the assets 170 include safety interlocks, are associated with certain user-defined restrictions, and similar types of information that may be specific to a particular asset 170. As such, the information contained in the program configured load profile component 194 may be provided to the asset scheduling component 168 such that the asset scheduling component 168 may be aware of the various operating characteristics of each asset 170. The asset scheduling component 168 may then coordinate the operations of the assets 170 in accordance with the information provided by the program configured load profile 194.

The program demand control routines component 196 may include computer-executable instructions to control the operations of the assets 170 based on various energy demand characteristics. For instance, the program demand control routines component 196 may provide procedures in which to operate the assets 170 based on energy demand parameters provided by the demand control engine 166. The program demand control routines component 196 may control the energy demands of the assets 170 using a number of techniques. In one example, the program demand control routines component 196 may implement a program modulation which may cause the assets 170 in each work area 62, work cell 64, or work unit 62 to modulate their energy according to a specified pattern or such that the overall energy demand of the industrial automation system is reduced.

The program demand control routines component 196 may also employ an energy exchange technique in regulating the energy demand of the assets 170. The energy exchange technique may involve transferring stored energy between assets 170, work areas 62, work cells 64, work units 66, and the like such that the overall energy demand of the industrial automation system is reduced, matches a specified pattern, or the like. The energy exchange technique may also alter the manner in which a production process may be performed in order to reduce the overall energy demand of the industrial automation system for different periods of time. In certain embodiments, the energy exchange technique may involve determining how each asset 170 may operate more efficiently based on information stored in the corresponding asset energy profile data 28. As such, the program demand control routines component 196 may then directly configure the corresponding asset 170 to operate more efficiently by ensuring that the asset 170 is operating as per the information indicated in the corresponding asset energy profile data 28.

Other methods in which the program demand control routines component 196 may control the demand of the assets 170 may include sending commands to certain assets 170 to generate energy for the industrial automation system or release stored energy in various batteries, capacitor banks, and the like. The program demand control routines component 196 may also stagger loads such that multiple loads or machines may be operating at different times in order to reduce the overall energy demand of the industrial automation system. The program demand control routines component 196 may also send commands to assets 170 that have regenerative loads to redirect the regenerative energy back to the industrial automation system, the utility (e.g., grid), or the like.

Figure 10:
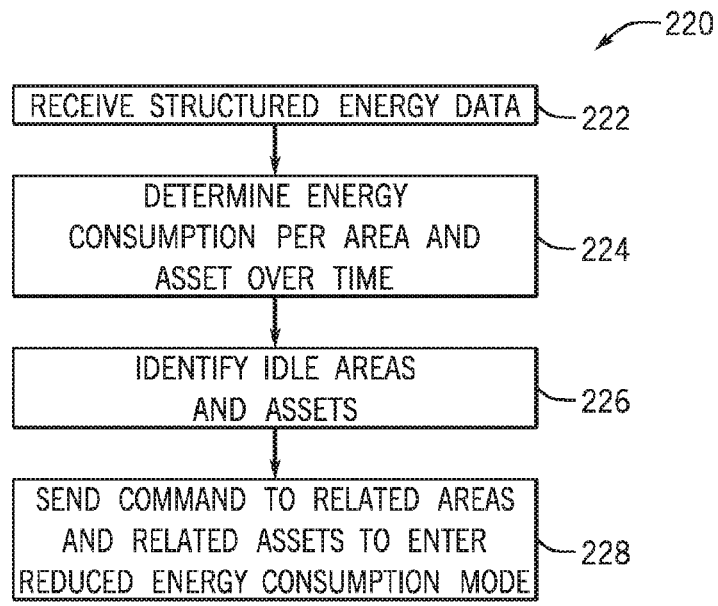
FIG. 10 is a flow chart of a method for placing assets in the industrial automation system into a reduced power consumption mode based on energy information determined by the energy inference engine of FIG. 8, the energy state engine of FIG. 9, or both, in accordance with an embodiment.

Keeping the foregoing in mind, FIGS. 10-14 depict flow charts of various methods that may be employed in managing the energy properties of the assets 170 of the industrial automation system based on information gathered from the organizational model data 22, the energy state engine 162, and the like. Referring now to FIG. 10, FIG. 10 depicts a flow chart of a method 220 for placing assets 170 in the industrial automation system into a reduced power consumption mode based on energy information determined by the energy inference engine 132, the energy state engine 162, or via the organizational model data 26. In certain embodiments, the method 220 may be performed by the energy data controller 12, which may be communicatively coupled to the assets 170.

At block 222, the energy data controller 12 may receive structured energy data related to an industrial automation system. The structured energy data may depict the energy data 22 with respect to the organizational model data 26 as described above. As such, the structured energy data may include the energy data 22 organized as physical energy data 30, logical energy data 32, and virtual energy data 34.

Using the structured energy data related to the industrial automation system, the energy data controller 12 may, at block 224, determine an amount of energy currently being consumed by each work area 62, work cell 64, work unit 62, and the like in the industrial automation system. The energy data controller 12 may also determine an amount of energy being consumed by each asset 170.

At block 226, the energy data controller 12 may identify any work area 62, work cell 64, work unit 62, and the like or any asset 170 that may be idle. That is, the energy data controller 12 may analyze the current amounts of energy being consumed according to the structured energy data to determine which parts or assets in the industrial automation system are not currently in service or use.

At block 228, the energy data controller 12 may send commands to individual idle assets or assets in parts of the industrial automation system identified as being idle to enter into a reduced energy mode of operation. As such, the idle assets may not waste energy by unnecessarily keeping the entire asset powered on. Instead, the reduced energy mode may enable the idle assets to keep critical operations running while minimizing the use of non-critical operations. In one embodiment, the reduced energy mode may involve placing the asset 170 offline such that it consumes no energy. This case may be limited, however, to those assets that may be quickly brought back online without involving a long start-up or warm-up process.

In certain embodiments, the energy data controller 12 may, at block 224, determine how each part of the industrial automation system and each asset 170 in the industrial automation system may consume energy with respect to time. At block 226, the energy data controller 12 may recognize periods of time or patterns of energy use when parts of the industrial automation system or the assets 170 may be idle for some period of time. Here, the energy data controller 12 may, at block 228, send commands to the asset scheduling component 168 to modify the operations of the assets in the identified areas of the industrial automation system at similar periods of time or based on the patterns of energy use. That is, the asset scheduling component 168 may adjust the scheduled use of the identified assets such that they enter the reduced energy mode during time periods when the assets or the parts of the industrial automation system are expected to be idle.

Figure 11:
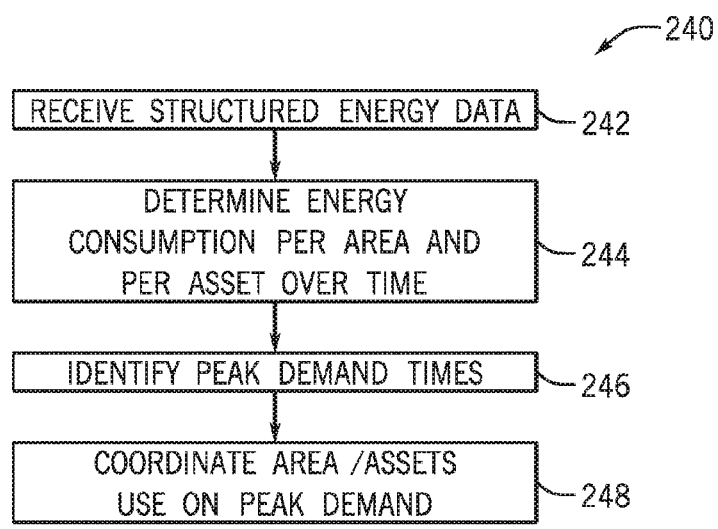
FIG. 11 is a flow chart of a method for coordinating the use of assets in the industrial automation system based on peak energy times and energy information determined by the energy inference engine of FIG. 8, the energy state engine of FIG. 9, or both, in accordance with an embodiment.

FIG. 11 depicts a flow chart of a method 240 for coordinating the use of the assets 170 in the industrial automation system based on peak energy times and energy information determined by the energy inference engine 132, the energy state engine 162, or the organizational model data 26. Like the method 220 of FIG. 10, in certain embodiments, the method 240 may be performed by the energy data controller 12, which may be communicatively coupled to the assets 170.

At block 242 and block 244, the energy data controller 12 may receive the structured energy data and may determine the energy for each asset 170 and part of the industrial automation system over time as described above with respect to blocks 222 and 224 of FIG. 10. At block 246, the energy data controller 12 may identify periods of time when the industrial automation system may have its highest energy demands (i.e., peak demand times).

At block 246, the energy data controller 12 may coordinate the operations of the assets 170 with respect to the organizational model data 26 such that the peak energy demand of the industrial automation system may be reduced. As such, the energy data controller 12 may use the demand control engine 166 and/or the asset scheduling component 168 to coordinate the operations of the assets 170 such that the assets 170 use less energy as described above. For instance, the energy data controller 12 may use the assets 170 such that they stagger loads. Alternatively or additionally, the energy data controller 12 may send commands to assets 170 capable of generating energy (e.g., generators) to generate energy for the industrial automation system such that the net result is that the overall energy use of the industrial automation system is reduced.

In any case, by reducing the peak energy demand of parts of the industrial automation system or assets 170 in the industrial automation system, the energy data controller 12 may enable the industrial automation system to operate more efficiently. Moreover, by reducing the peak energy demand of the industrial automation system, the energy data controller 12 may reduce the stress that may be placed on the utility providing the energy or the assets 170 consuming the energy. As a result, the industrial automation system may be more sustainable and the risk of failures occurring within the industrial automation system due to situations when too much energy is being consumed may be averted.

Figure 12:
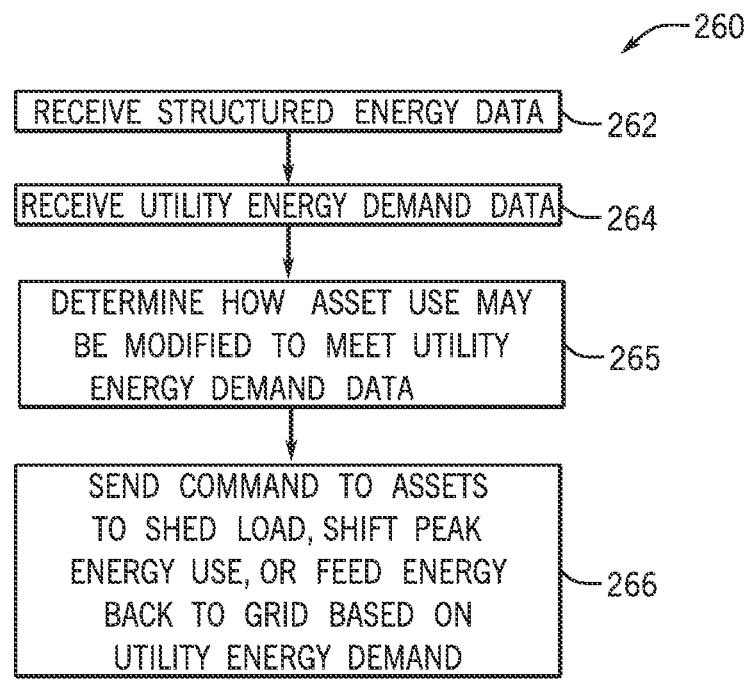
FIG. 12 is a flow chart of a method for coordinating the use of assets in the industrial automation system based on a utility demand schedule and energy information determined by the energy inference engine of FIG. 8, the energy state engine of FIG. 9, or both, in accordance with an embodiment.

FIG. 12 depicts a flow chart of a method 260 for coordinating the use of the assets 170 in the industrial automation system based on a utility demand schedule and energy information determined by the energy inference engine 132, the energy state engine 162, or the organizational model data 26. Like the method 220 of FIG. 10, in certain embodiments, the method 260 may be performed by the energy data controller 12, which may be communicatively coupled to the assets 170.

At block 262, the energy data controller 12 may receive the structured energy data for each asset 170 and each part of the industrial automation system as described above with respect to block 222 of FIG. 10. At block 264, the energy data controller 12 may receive utility demand data from a utility, an energy provider, or the like. The utility energy demand data may include information related to time periods that the utility may experience peak demand, rates for energy consumption at different time periods, and the like. In one embodiment, the utility energy demand data may include a request to reduce energy consumption during certain hours, a request to provide energy back to the grid during certain hours, or the like.

At block 266, the energy data controller 12 may determine how the operations of the assets 170 may be adjusted to accommodate the utility energy demand data based on the structured energy data. That is, the energy data controller 12 may predict an amount of energy in parts of the industrial automation system or the entire industrial automation system may be consumed over time. The energy data controller 12 may then develop a strategy that may accommodate at least some of the utility energy data based on these predictions.

At block 268, the energy data controller 12 may send commands to modify the operations of the assets 170 based on the utility energy demand data. That is, the energy data controller 12 may interface with the demand control engine 166, the asset scheduling component 168, or the like to reduce energy consumption by parts of the industrial automation system or the entire industrial automation system based during peak demand for the utility.

The energy data controller 12 may also modify the scheduled use of the assets 170 such that the energy consumed by parts or the entire industrial automation system is the most economical based on the pricing or rate schedule for energy consumption as provided by the utility energy demand data. For example, the energy data controller 12 may shift some of the core processes of the industrial automation system to be performed during off-peak (i.e., low rate) hours such that the industrial automation system may reduce its costs with regard to the energy it consumes.

In one embodiment, the energy data controller 12 may send commands to the assets 170 (via the demand control engine 166, the asset scheduling component 168, or the like) to feed or supply energy back to the grid as per request indicated in the utility energy demand data. As such, the energy data controller 12 may instruct the assets 170 capable of generating energy to generate energy and direct the energy to the utility grid. Similarly, the energy data controller 12 may instruct the assets 170 having regenerative energy characteristics to direct the regenerative energy to the utility grid.

In yet another embodiment, the energy data controller 12 may send commands to the assets 170 (via the demand control engine 166, the asset scheduling component 168, or the like) to improve the power quality of the industrial automation system. As such, the energy data controller 12 may instruct the assets 170 having inductive loads or potentially affecting the power quality of the industrial automation system to power down.

Figure 13:
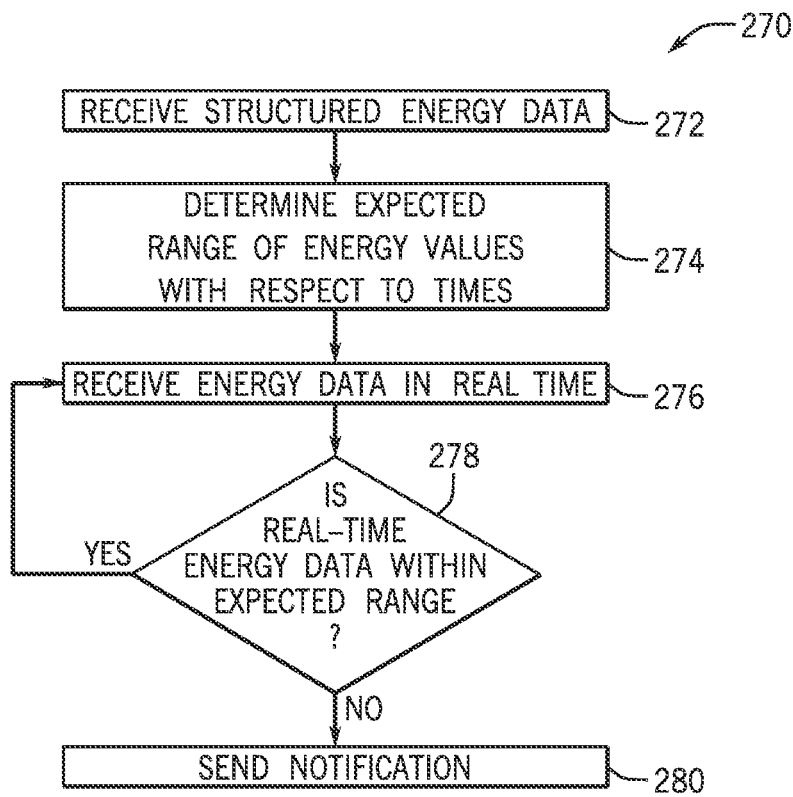
FIG. 13 is a flow chart of a method for notifying an operator in the industrial automation system when energy usage of a component falls outside an expected range based on energy information determined by the energy inference engine of FIG. 8, the energy state engine of FIG. 9, or both, in accordance with an embodiment.

FIG. 13 depicts a flow chart of a method 270 for notifying an operator in the industrial automation system when energy usage of a component falls outside an expected range based on energy information determined by the energy inference engine 132, the energy state engine 162, or the organizational model data 26. Like the method 220 of FIG. 10, in certain embodiments, the method 270 may be performed by the energy data controller 12, which may be communicatively coupled to the assets 170.

At block 272, the energy data controller 12 may receive the structured energy data for each asset 170 and each part of the industrial automation system as described above with respect to block 222 of FIG. 10. At block 274, the energy data controller 12 may determine an expected range of energy values for each part of the industrial automation system, the entire industrial automation system, each asset 170, and the like based on the structured energy data over time. That is, the energy data controller 12 may monitor and record the energy pattern of each part of the industrial automation system, the entire industrial automation system, each asset 170, and the like over some period of time. The energy data controller 12 may then determine a range of expected energy values for various segments of time during the period of time based on the recorded energy values. In one embodiment, the range of expected energy values may include energy data that have been attributed to valid or normal energy values for the respective part of the industrial automation system, the entire industrial automation system, each asset 170, or the like. That is, the recorded energy values that may be attributed to adverse or irregular circumstances (e.g., fault) may be removed from consideration as part of the range of expected energy values.

At block 276, the energy data controller 12 may receive energy data 22 in real time from the assets 170. As such, the energy data controller 12 may receive energy figures from power meters 50 coupled to the assets 170, directly from the assets 170 (e.g., CIP energy objects), or the like. In certain embodiments, the energy data controller 12 may determine the physical energy data 32, the logical energy data 34, and the virtual energy data 36 that correspond to the current state of parts of the industrial automation system, the entire industrial automation system, the assets 170, and the like based on the structured energy data.

At block 278, the energy data controller 12 may determine whether the real-time energy data received at block 276 falls within the range of expected energy values. As such, the energy data controller 12 may determine whether various scales (e.g., work area, work cell, work unit, asset) of the real-time energy falls within the corresponding scaled range of expected energy values. If the real-time energy data does not fall within the range of expected energy values, the energy data controller 12 may proceed to block 280 and send a notification to a supervisory controller, an operator of the industrial automation system, or the like. In this way, the operator may be aware of any problems or potential problems that may be occurring in the industrial automation system based on the energy being consumed by the industrial automation system.

If, however, at block 278, the real-time energy data does indeed fall within the range of expected energy values, the energy data controller 12 may return to block 276 and send continue to receive energy data 22 in real time. The method 270 may thus run continuously such that the energy properties of the industrial automation system are continuously monitored.

FIG. 14 depicts a flow chart of a method 290 for modifying a scheduled use of the assets 170 in the industrial automation system based on a utility demand schedule and energy information determined by the energy inference engine 132, the energy state engine 162, or the organizational model data 26. Like the method 220 of FIG. 10, in certain embodiments, the method 290 may be performed by the energy data controller 12, which may be communicatively coupled to the assets 170.

At block 292, the energy data controller 12 may receive the structured energy data for each asset 170 and each part of the industrial automation system as described above with respect to block 222 of FIG. 10. At block 294, the energy data controller 12 may receive an asset schedule that may indicate how the assets 170 are scheduled for use with respect to the organizational model data 26.

The energy data controller 12 may then, at block 296, determine the energy of parts of the industrial automation drive, the entire industrial automation drive, the assets 170, or the like based on the structured energy data and the asset schedule. That is, the energy data controller 12 may calculate or predict the amount of energy each asset 170 may consume or produce if each asset 170 is operated according to the asset schedule and exhibit energy properties as specified in the structured energy data.

At block 298, the energy data controller 12 may modify the scheduled use of the assets 170 (i.e., the asset schedule) such that the energy consumption does not exceed some energy consumption target. The energy consumption target may specify an amount of energy that may be consumed by the assets 170 in scalable terms with respect to the industrial automation system. For example, the energy consumption target may provide an energy consumption value for multiple work areas 62 in the industrial automation system, the factory 60, or the like.

When modifying the scheduled use of the assets 170, the energy data controller 12 may adjust the use of the assets 170 as described above. In certain embodiments, the energy data controller 12 may adjust the asset schedule such that the level of productivity of the industrial automation system may be maintained while operating more efficiently with respect to energy being consumed by the industrial automation system. After modifying the asset schedule, the energy data controller 12 may predict whether the energy consumption of the assets 170 will be below the energy set point. If not, the energy data controller 12 may iteratively adjust the asset schedule and predict the energy consumption of the assets 170 based on the adjusted asset schedule until the energy consumption of the assets 170 is below the energy target.

FIG. 15 is a block diagram of a multi-core processor 300 that may be employed in the energy management system 10. As shown in FIG. 15, the processor 14 of the energy data controller 12 may include multiple independent central processing units (CPUs) or cores. In one embodiment, the processor 14 may include four cores as shown in FIG. 15; however, it should be noted that the processor 14 may include any number of cores. By using multiple cores in the processor 14, computing operations for different functions may be performed by different cores. As a result, the processor 14 may perform different functions in parallel, thereby performing each function more quickly.

In one embodiment, the processor 14 may include an energy core 302, a control core 304, a security core 306, and a safety core 308. The energy core 302 may perform energy data interpretations such as leveraging the energy data 22 with the organizational model 26, as described above with respect to FIGS. 1-14. As a result, the energy core 302 may continuously calculate the physical energy data 30, the logical energy data 32, and the virtual energy data 34 (i.e., structured energy data) in real time. Moreover, the energy core 302 may monitor power quality of parts of the industrial automation system, the entire industrial automation system, or the like. As such, the energy data core 302 may monitor an electronic signature of parts of the industrial automation system, the entire industrial automation system, or the like to predict a peak energy demand. In this case, the energy core 302 may send commands to the control core 304 to adjust the operations of the assets 170 to prevent reaching the peak energy demand or the like.

The control core 304 may, in one embodiment, perform control related functions for the assets 170 based on the structured energy data or the like as described above with respect to FIGS. 8-14. That is, the processes and functionalities of the inference engine 132 and the energy state engine 162 may continuously be performed within the energy core 302, which may send control commands to the control core 304. As a result, the energy data controller 12 may control the assets 170 in real time using the control core 304 based on real time energy data determined by the energy core 302. Moreover, since the processes of the energy core 302 and the control core 304 may be performed in parallel, the energy data controller 12 may respond more quickly and control the operations of the assets 170, the assets 170 within a part of the industrial automation system, or the assets 170 in the entire industrial automation system based on real time energy data related to the same.

In addition to the energy core 302 and the control core 304, the processor 14 may use the security core 306 and the safety core 308 to monitor and control the security and safety operations of the industrial automation system. For instance, the security core 306 may monitor various security signals received from devices intended to protect the industrial automation system from unauthorized use.

Similarly, the safety core 308 may monitor the safety devices in the industrial automation system and send notifications to certain personnel when the safety of operators in the industrial automation system is being compromised. For example, the safety core 308 may monitor data received from light curtains designed to ensure that humans do not enter a particular area. If however, the safety core 308 receives a signal from a light curtain indicating that the light curtain may have been broken, the safety core 308 may send commands to the assets 170 located within the light curtain to power down. The safety core 308 may also send a notification to an appropriate party indicating that the light curtain was broken. In one embodiment, the safety core 308 may use the structured energy data from the energy data core to determine the assets 170 that may be located within the light curtain and may send commands to the devices providing energy to those assets 170 to power down, thereby effectively powering down the assets 170 by isolating the assets 170 from its power source.

In certain embodiments, the energy data controller 12 may work in conjuction with cloud-based systems and the like to perform large data computations related to the processes described above and the like.

For example, in one embodiment a method in a computing system for performing statistical computations on a data set that is larger than can fit in memory practicably and using said data set for controlling assets 170 in the industrial automation system based on certain energy management criteria may include providing the data set that include energy information collected from a plurality of assets. Each of the assets may operatively communicate to an external data storage medium (e.g., cloud-based system) and utilize an energy object having an identifier associated with an energy resource and a measurement characteristic associated with the energy resource. The method may then include performing a statistical computation on the data by accessing and processing the data at the external data storage medium and communicating information back to a controller (e.g., energy data controller 12) associated with the asset for performing energy management actions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    a processor configured to:
        receive structured energy data associated with one or more assets in an automation system, wherein the structured energy data comprises a logical grouping of assets in the automation system, wherein the logical grouping of assets is organized with respect to different manufacturing processes of the automation system;
        determine energy properties of the one or more assets with respect to the logical grouping over a period of time, wherein the energy properties comprise power usage data of the one or more assets;
        identify one or more peak demand periods of one or more portions of the one or more assets with respect to the logical grouping during the period of time based on the power usage data of the one or more assets with respect to the logical grouping;
        identify an energy bottleneck of the one or more portions of the one or more assets with respect to the logical grouping based on the one or more peak demand periods;
        determine an asset schedule configured to coordinate one or more operations of the portions of the one or more assets according to the logical grouping, wherein the operations are coordinated to reduce an energy demand of the automation system during the one or more peak demand periods to reduce the energy bottleneck;
        send one or more commands to at least some of the one or more assets to reduce energy consumption according to the asset schedule; and control the one or more assets according to the one or more commands.

2. The system of claim 1, wherein the commands are configured to shed loads of the assets with respect to the logical grouping, exchange energy between the one or more assets, stagger loads, release stored energy, provide energy back to a grid, or any combination thereof.

3. The system of claim 1, wherein the commands are configured to use the different manufacturing processes as a battery.

4. The system of claim 1, wherein the structured energy data is generated based on an organizational model data comprising the logical grouping of the assets with respect to one or more functionalities of the automation system.

5. A system, comprising:
a processor configured to:
receive structured energy data associated with one or more assets in an automation system, wherein the structured energy data comprises a logical grouping of assets in the automation system, wherein the logical grouping of assets is organized with respect to different manufacturing processes of the automation system;
receive an asset schedule associated with one or more operations of the one or more assets over time;
predict an amount of energy of each asset of the one or more assets consumes or produces over the time based on the asset schedule;
identify an energy bottleneck of the one or more assets based on the predicted amount of energy each asset consumes or produces;
modify the asset schedule based on the predicted amount of energy each asset consumes or produces, wherein the modified asset schedule is configured to maintain an energy target for the automation system and reduce the energy bottleneck of the one or more assets;
send one or more commands to at least some of the one or more assets to control the at least some of the one or more assets according to the modified asset schedule; and
control the one or more assets according to the one or more commands.

6. The system of claim 5, wherein the modified asset schedule is configured to coordinate one or more operations of the one or more assets according to the logical grouping, wherein the operations are coordinated with respect to the logical grouping such that energy associated with the automation system is similar to the energy target.

7. The system of claim 5, wherein the processor is configured to determine confidence values associated with the predicted amount of energy of each asset of the one or more assets consumes or produces, wherein the confidence values correspond to determined accuracies associated with the amount of energy of each asset of the one or more assets consumes or produces, and wherein the processor is configured to modify the asset schedule based at least in part on the confidence values.

* * * * *